United States Patent [19]

Neitz et al.

[11] Patent Number: 4,499,871
[45] Date of Patent: Feb. 19, 1985

[54] FUEL INJECTION METHOD AND ARRANGEMENT FOR DIRECT-INJECTION INTERNAL COMBUSTION ENGINES

[75] Inventors: Alfred Neitz, Röthenbach; Nunzio D'Alfonso; Hans Pickel, both of Nuremberg, all of Fed. Rep. of Germany

[73] Assignee: M.A.N. Maschinenfabrik Ausburg-Nürnberg AG, Nuremberg, Fed. Rep. of Germany

[21] Appl. No.: 520,147

[22] Filed: Aug. 4, 1983

Related U.S. Application Data

[63] Continuation-in-part of Ser. No. 334,003, Dec. 23, 1981, abandoned, which is a continuation of Ser. No. 154,107, May 28, 1980, abandoned.

[30] Foreign Application Priority Data

Jun. 12, 1979 [DE] Fed. Rep. of Germany ....... 2923670

[51] Int. Cl.³ .......................... F02B 3/04; F02D 5/06
[52] U.S. Cl. .................................... 123/276; 123/301; 123/305; 123/418; 123/416; 239/453; 239/533.8
[58] Field of Search ............... 123/276, 301, 305, 294, 123/305, 416, 418; 239/533.8, 533.2, 533.4, 533.5, 533.6, 452, 453

[56] References Cited

U.S. PATENT DOCUMENTS

| | | | |
|---|---|---|---|
| 2,012,086 | 8/1935 | Mock | 123/301 |
| 3,018,792 | 1/1982 | Brucker | 239/453 |
| 3,035,780 | 5/1982 | Péras | 239/453 |
| 3,590,789 | 7/1971 | Wiebicke et al. | 123/301 |
| 3,892,208 | 7/1975 | Anderson et al. | 123/305 |
| 3,910,503 | 10/1975 | Barber | 239/533 X |
| 4,166,437 | 9/1979 | Bianchi et al. | 123/416 |
| 4,262,644 | 4/1981 | Walker et al. | 123/418 |

*Primary Examiner*—Raymond A. Nelli
*Attorney, Agent, or Firm*—Peter K. Kontler

[57] ABSTRACT

A direct-injection internal combustion engine has a rotationally symmetric combustion chamber which is located in the crown of a piston. Air for combustion is admitted into the combustion chamber in such a manner as to circulate about the axis of the latter. Fuel is injected into the combustion chamber through a discharge passage as a function of the engine load and speed. Within the upper range of engine load and speed, the fuel is injected as a concentrated jet and virtually all of the fuel is deposited upon the wall of the combustion chamber. The fuel evaporates from the wall and then mixes with the circulating air. In the lower range of engine load and speed, as well as during idling, the fuel is injected in the form of a finely atomized jet and mixes with the circulating air directly. The effective cross-sectional area of the fuel discharge passage in the lower range of engine load and speed is maintained between about 3 and 15% of the effective cross-sectional area at maximum output. Furthermore, the maximum injection pressure at the discharge passage at nominal rating is maintained at a value approximately 2 to 3 times greater than the pressure required to open the discharge passage.

30 Claims, 23 Drawing Figures

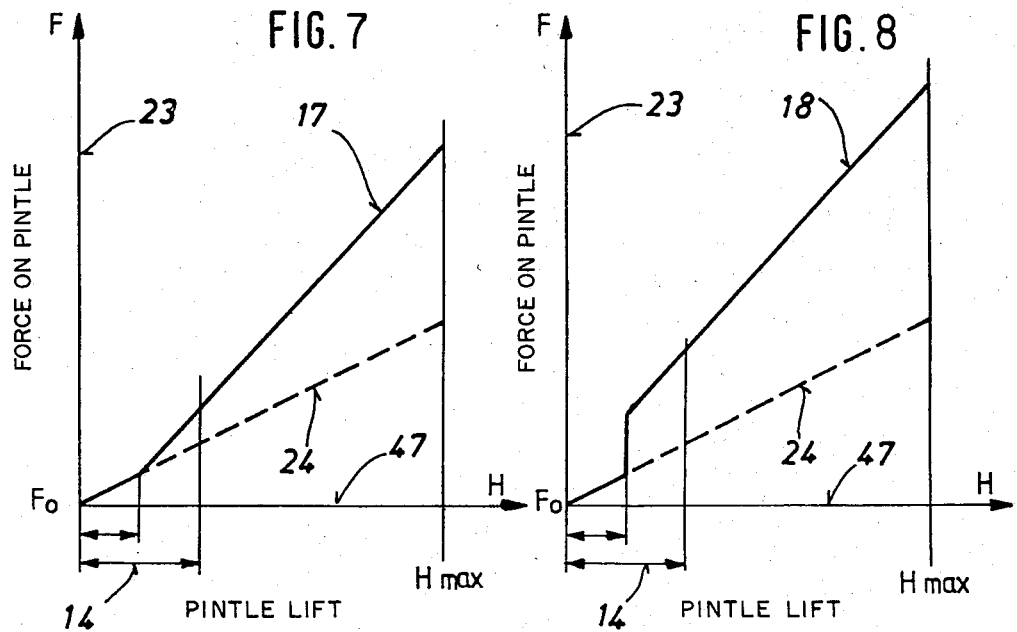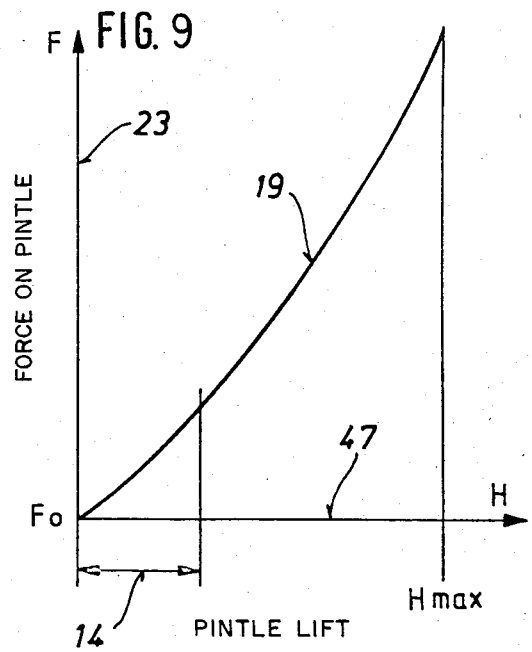

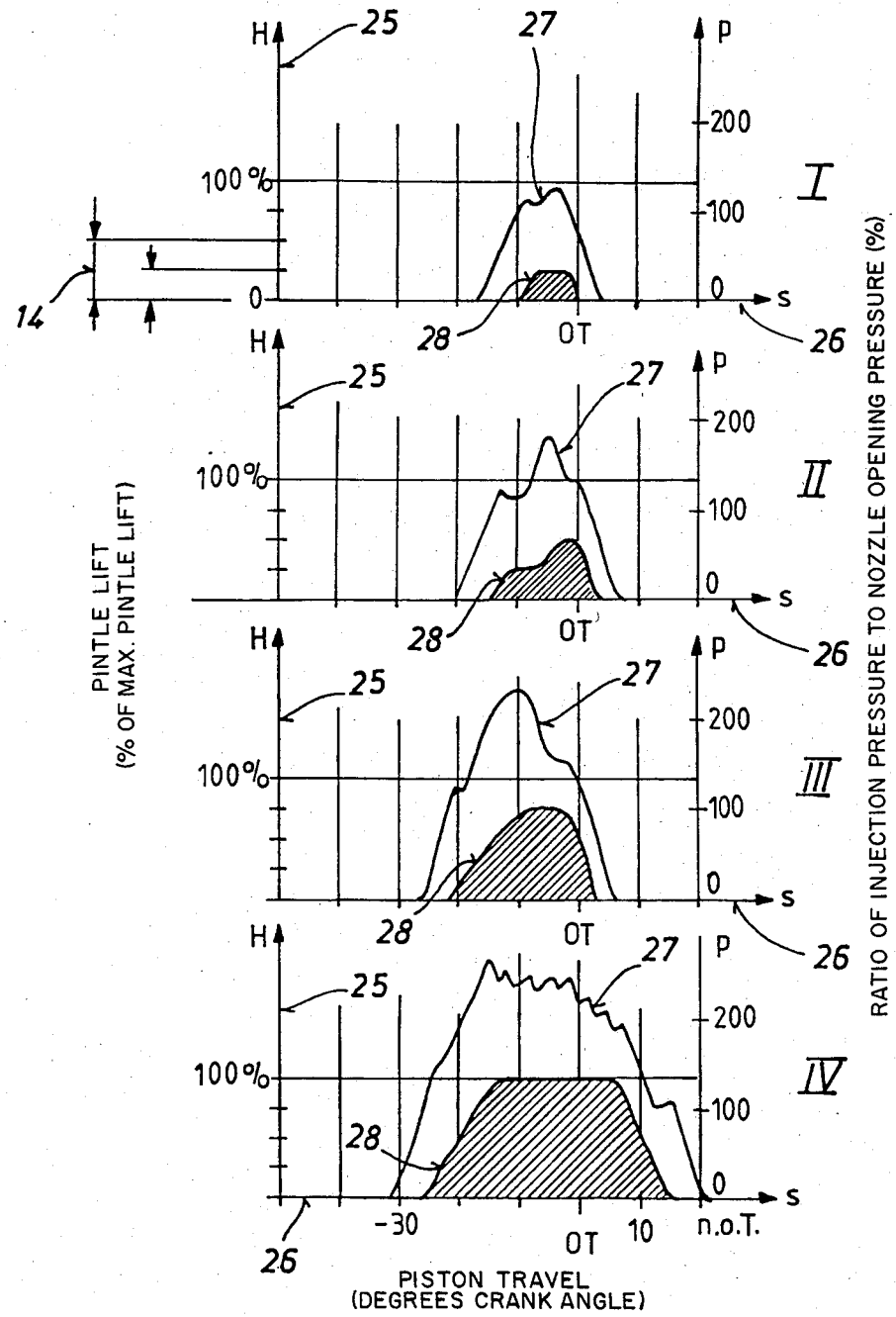

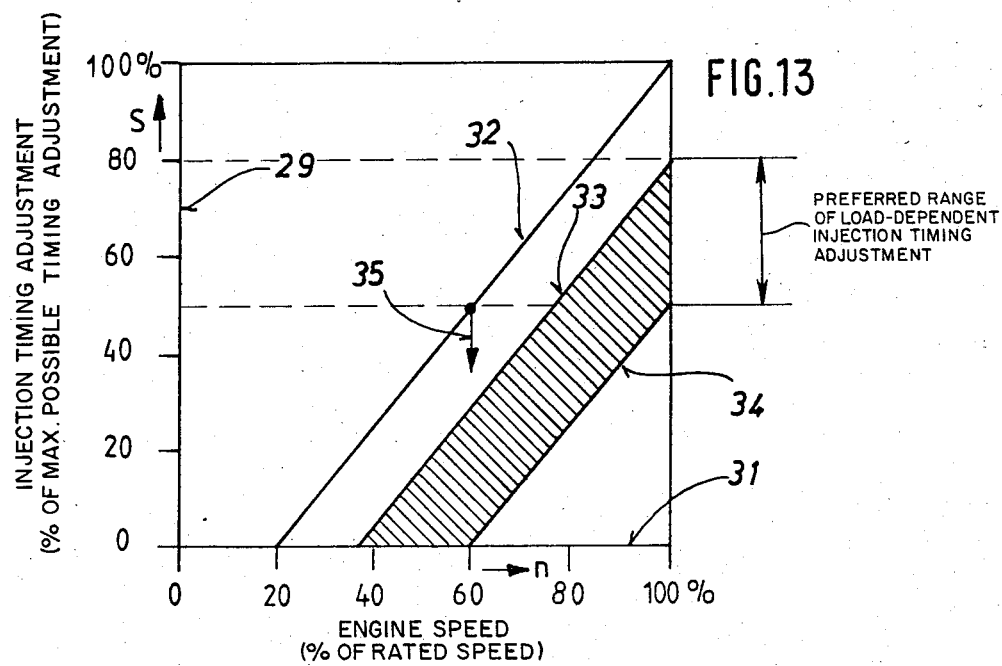
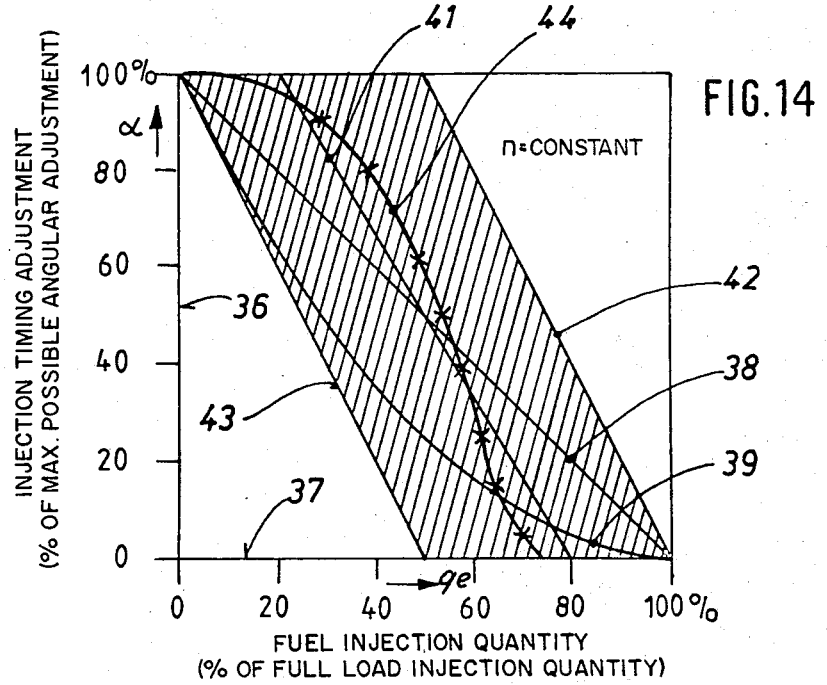

FUEL INJECTION METHOD AND ARRANGEMENT FOR DIRECT-INJECTION INTERNAL COMBUSTION ENGINES

CROSS-REFERENCE TO RELATED APPLICATIONS

This application is a continuation-in-part of application Ser. No. 334,003 filed Dec. 23, 1981, and now abandoned which, in turn, is a continuation of application Ser. No. 154,107 filed May 28, 1980, and now abandoned.

BACKGROUND OF THE INVENTION

The invention relates generally to an internal combustion engine, especially a direct-injection, compression-ignition or spark-ignition internal combustion engine.

More particularly, the invention relates to a fuel injection method and arrangement for an internal combustion engine.

A known direct-injection, compression-ignition or spark-ignition internal combustion engine is provided with a combustion chamber having the shape of a body of rotation. An air swirl is generated in the combustion chamber and fuel is injected into the latter via an injection nozzle.

It is recognized that there are advantages to be obtained by matching the fuel injection conditions to the operating condition of the engine. For instance, it has been found that a compact fuel jet is advantageous during operation at full load and high speed. Such a jet causes the greatest possible amount of fuel to be deposited on, or at least transported to the vicinity of, the hot wall of the combustion chamber. The fuel deposited on or brought into the vicinity of the combustion chamber wall evaporates. Mixing of the fuel with the air is effected mainly by the air swirl generated in the combustion chamber.

Many of the conventional internal combustion engines are equipped with injection nozzles which are provided with an opening of constant cross-sectional area. In order to obtain a compact fuel jet with an injection nozzle of this type, the cross-sectional area of the opening must be large. Fuel injection takes place at a relatively low pressure.

During operation at no load or in the low load range at low speed, it is of advantage for the fuel to be injected in the form of a finely atomized spray so that the fuel mixes with the air directly and does not reach the combustion chamber wall which, in this case, is relatively cold. Mixing of the fuel and the air as well as combustion take place rapidly and completely and there are no uncombusted fuel fractions to be exhausted. This mode of fuel injection is also applicable for cold starting and for running up a cold engine. Mixture formation is here mainly a function of fuel atomization which, in turn, depends primarily upon the relative velocity of the fuel and air.

In order to obtain a finely atomized fuel spray from a nozzle having an opening of constant cross-sectional area, the opening must be small. For a given fuel delivery rate, this results in a relatively high fuel velocity and relatively high pressure at the opening.

In an attempt to obtain satisfactory fuel injection characteristics under all operating conditions, it was proposed to use an injection nozzle having an opening of variable cross-sectional area, e.g. a throttling pintle nozzle. Although some improvement was achieved relative to an injection nozzle having an opening of constant cross-sectional area, the benefits were realized under only some operating conditions of the engine. Generally, improvement was obtained only in the uppermost and lowermost load ranges. Furthermore, the benefits were inconsistent and could not be adequately controlled.

OBJECTS AND SUMMARY OF THE INVENTION

It is an object of the invention to match fuel injection characteristics to engine operating conditions with a high degree of precision.

Another object of the invention is to provide a fuel injection method and arrangement which enable emissions such as hydrocarbons and blue smoke to be reduced.

An additional object of the invention is to provide a fuel injection method and arrangement which enable cold starting and running up of a cold engine to be improved.

A further object of the invention is to provide an air-compression, direct-injection internal combustion engine with compression-ignition or spark-ignition in which the fuel injection characteristics may be matched to the engine operating conditions in such a manner that emissions such as hydrocarbons and blue smoke may be minimized under all operating conditions while cold starting and running up of the engine when cold are improved.

It is also an object of the invention to provide a fuel injection method which makes it possible to operate an internal combustion engine in such a manner that emissions such as hydrocarbons and blue smoke are minimized under all operating conditions while cold starting and running up of the engine when cold are improved.

The preceding objects, as well as others which will become apparent as the description proceeds, are achieved by the invention.

One aspect of the invention resides in an air-compression, direct-injection internal combustion engine with compression-ignition or spark-ignition. The engine comprises the following:

(a) A cylinder.

(b) A piston reciprocable in the cylinder. The piston has a crown and the crown is provided with a combustion chamber in the form of a body of rotation. The crown defines a wall which surrounds the combustion chamber. The piston may be arranged to drive a crank.

(c) Admitting means for admitting air into the combustion chamber. The admitting means is arranged to generate an air swirl in the combustion chamber which circulates about the axis of the latter.

(d) Fuel injection means for injecting fuel into the combustion chamber. The injection means is provided with a fuel discharge passage and includes a member movable between a closed position of the discharge passage and a plurality of open positions of the discharge passage. The injection means is designed such that the effective cross-sectional area of the discharge passage varies during movement of the member between its closed and open positions.

(e) Control means for controlling the member so as to regulate the quantity of fuel which is injected into the combustion chamber as a function of the load and/or speed of the engine. The control means is designed to move the member in such a manner that at least the predominant part of the fuel impinges upon the combustion chamber wall within the upper range of the engine load and/or speed to subsequently evaporate from the wall and mix with the air while at least the predominant part of the fuel mixes directly with the air during idling as well as in the lower range of the engine load and/or speed. The control means is also designed so that the effective cross-sectional area of the discharge passage in the lower range of the engine load and/or speed is between about 3 and 15% of the effective cross-sectional area of the discharge passage at maximum output. The injection means and control means are further designed in such a manner that the maximum injection pressure at the discharge passage at nominal rating is approximately 2 to 3 times the pressure required to open the passage.

Another aspect of the invention resides in a method of operating an internal combustion engine having a combustion chamber which is surrounded by a wall. The method comprises the following steps:

(a) Generating an air swirl in the combustion chamber which circulates about the axis of the latter.

(b) Injecting fuel into the combustion chamber through a discharge passage.

(c) Regulating the injection of fuel into the combustion chamber as a function of the load and/or speed of the engine. The regulating step includes the operation of depositing at least the predominant part of the fuel upon the combustion chamber wall within the upper load and/or speed range to thereby cause at least the predominant part of the fuel to mix with the air subsequent to evaporation from the wall. The regulating step further includes the operation of mixing at least the predominant part of the fuel with the air directly during idling as well as in the lower load and/or speed range. The regulating step also includes the operation of maintaining the effective cross-sectional area of the discharge passage in the lower load and/or speed range between about 3 and 15% of the effective cross-sectional area of the discharge passage at maximum output. The regulating step additionally includes the operation of maintaining the maximum injection pressure at the discharge passage at nominal rating approximately 2 to 3 times greater than the pressure required to open the discharge passage.

A pintle nozzle is preferably used to inject the fuel into the combustion chamber. For the sake of convenience, the description which follows is with reference to such a nozzle.

According to a preferred embodiment of the invention, the performance range of the engine, that is, the range from no load to full load, is divided into a plurality of bands, e.g. four bands. The engine speed may vary along the bands. The pintle of the nozzle is controlled in such a manner that the fuel jet has different characteristics in the various bands. The fuel jet characteristics in each band match the engine operating conditions corresponding to the band. These effects are achieved by moving the pintle so that the effective cross-sectional area for fuel injection increases with load and/or speed. Advantageously, the effective cross-sectional area for fuel injection increases continuously with increasing load and/or speed so as to constantly achieve a close match between the effective cross-sectional area and the engine operating conditions. It is further favorable for the rate of increase of the effective cross-sectional area in the upper load and/or speed range to be substantially greater than that in the lower load and/or speed range.

The selection of the bands is preferably based on the intended use of the engine, that is, on the range of speeds over which the engine is to be operated, the output required from the engine and the emission standards imposed upon the engine. The performance range of the engine is divided in such a manner that the most frequent operating conditions are assigned to a band which is wider than the remaining bands.

In the lower speed range, the effective cross-sectional area for fuel injection is relatively small. Consequently, the fuel is discharged into the combustion chamber at a relatively high velocity. As a result, the relative velocity of the fuel and the air is high since, at low speed, the air circulates in the combustion chamber relatively slowly. The high relative velocity of the fuel and the air promotes atomization of the fuel which then evaporates, mixes with the air and combusts before reaching the combustion chamber wall. Under these conditions, combustion is enhanced so that uncombusted hydrocarbons and blue smoke may be held to a minimum.

When the bands in the lower speed range are wide, the formation of an air-fuel mixture predominantly via fuel atomization occurs over a wider range of loads and speeds than when the bands in the lower speed range are narrow.

As stated earlier, the effective cross-sectional area for fuel injection in the lower load and/or speed range should be between about 3 and 15% of the effective cross-sectional area at maximum output. Within these limits, the nozzle should always be opened to only such an extent in the lower load and/or speed range that the discharge pressure and velocity of the fuel are sufficiently high to obtain a well-atomized spray. As the load and/or the speed increases, the effective cross-sectional area is gradually increased in such a manner that the rate of increase of the injection pressure at the hole or opening of the nozzle is continuously reduced and a well-concentrated fuel jet forms.

Preferably, the fuel injection rate is about $1 \pm 0.5$ mm$^3$ per degree of crank angle and liter of piston-swept volume in the idling range and about $2 \pm 1$ mm$^3$ per degree of crank angle and liter of piston-swept volume at full load and rated speed.

The fuel injection timing is advantageously varied as a function of engine load and/or engine speed. According to one embodiment of the invention, a fuel injection timing adjustment is used which, from full load to no load and at rated speed of the engine, is about 20 to 50% of the maximum speed-dependent timing change and remains substantially constant between rated speed and idling.

According to another embodiment of the invention, essentially all operating points on a plot of fuel injection rate versus fuel injection timing adjustment taken at constant engine speed lie within a region bounded by two pairs of substantially parallel lines. A first line of one pair is located substantially on the injection rate axis and runs from about 50 to 100% of the full load injection rate while the second line of this pair runs from about 0 to about 50% of the full load injection rate at a timing adjustment value substantially equalling 100% of the maximum timing adjustment. A first line of the other pair extends substantially from the point representing 100% of the full load injection rate and 0% of the maximum timing adjustment to the point representing 50% of the full load injection rate and 100% of the maximum timing adjustment. The second line of the last-mentioned pair extends substantially from the point representing 50% of the full load injection rate and 0% of the maximum timing adjustment to the point representing 0% of the full load injection rate and 100% of the maximum timing adjustment.

The novel features which are considered as characteristic of the invention are set forth in particular in the appended claims. The improved internal combustion engine itself, however, both as to its construction and its mode of operation, together with additional features and advantages thereof, will be best understood upon perusal of the following detailed description of certain specific embodiments with reference to the accompanying drawings.

BRIEF DESCRIPTION OF THE DRAWINGS

FIG. 7 is a plot of the force on the pintle versus pintle lift according to one embodiment of the invention;

FIG. 8 is a plot of the force on the pintle versus pintle lift in accordance with another embodiment of the invention;

FIG. 9 is a plot of the force on the pintle versus pintle lift according to a further embodiment of the invention;

FIGS. 12I-through-IV is a plot of pintle lift versus piston travel near top dead center in different operating bands of the engine of FIG. 1 and also illustrates the ratio of injection pressure to nozzle opening pressure as a function of piston travel near top dead center;

FIG. 13 is a plot of injection timing adjustment versus engine speed;

FIG. 14 is a plot of injection timing adjustment versus fuel injection rate;

DESCRIPTION OF THE PREFERRED EMBODIMENTS

Figure 1:
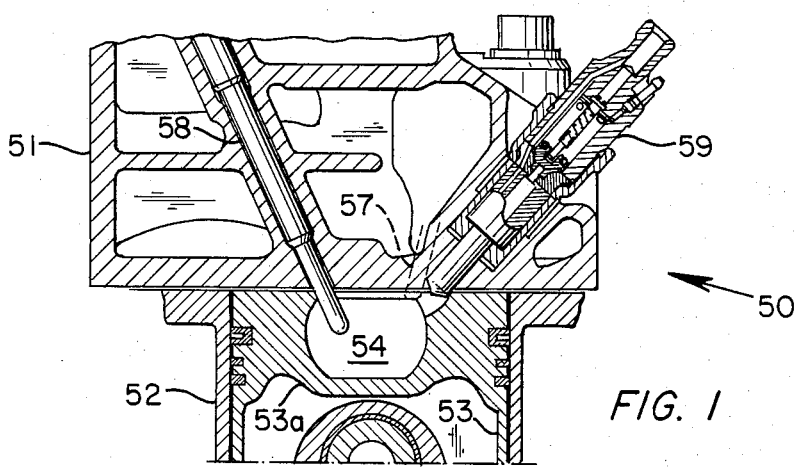
FIG. 1 is a cross-sectional view of a direct-injection internal combustion engine.

FIG. 1 illustrates an internal combustion engine which is generally identified by the reference numeral 50. The engine 50 is an air-compression, direct-injection engine which may operate with either compression-ignition or spark-ignition. By way of example, the engine 50 may be a diesel engine serving as the power plant for an automobile.

The engine 50 comprises a cylinder head 51 and a cylinder 52. A piston 53 is mounted for reciprocation in the cylinder 52. The piston 53 has a crown 53a which is formed with a rotationally symmetrical combustion chamber 54, that is, the combustion chamber 54 has the shape of a body of rotation.

The piston 53 drives a crankshaft 55 via a diagrammatically illustrated connection 56. The crankshaft 55 may, for instance, transmit power to the drive wheels of an automobile.

An air inlet port 57 in the cylinder head 51 opens into the combustion chamber 54. Air required for combustion is admitted into the combustion chamber 54 through the port 57. The port 57 is designed and positioned in such a manner that air entering the combustion chamber 54 swirls about the axis of symmetry of the latter, that is, the port 57 is designed and positioned so as to create an air swirl in the combustion chamber 54.

If desired, a glow plug 58 may be mounted in the cylinder head 51 so as to extend into the combustion chamber 54. The glow plug 58 is particularly useful in starting the engine 50 at low temperatures.

A fuel injection nozzle 59 is also mounted in the cylinder head 51 and serves to inject fuel for combustion into the combustion chamber 54.

Figure 2:
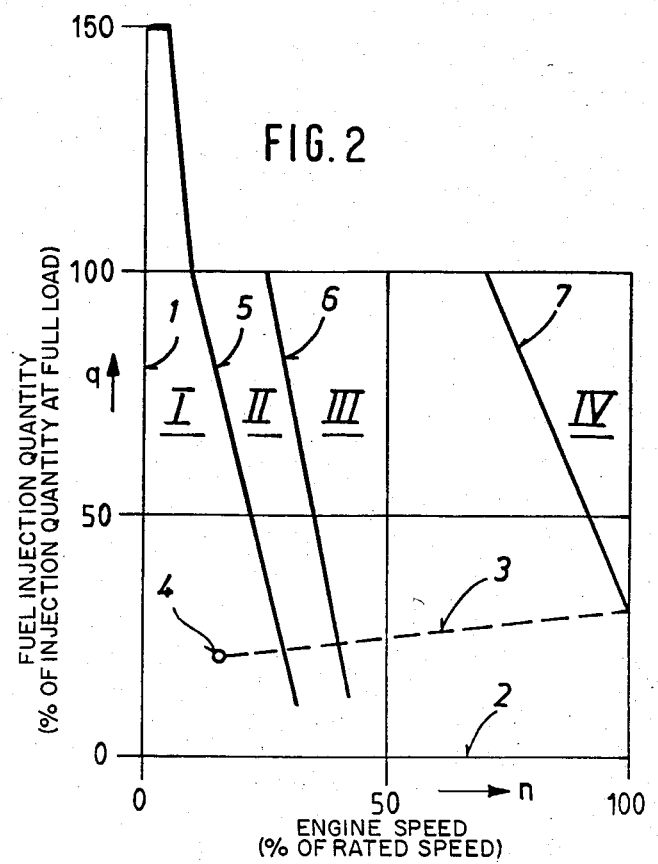
FIG. 2 is a plot of fuel injection rate versus engine speed.

FIG. 2 is a graph of fuel injection quantity (q) versus speed or rpm (n) of the engine 50. The fuel injection quantity constitutes the ordinate 1 and is plotted in terms of percentage of the injection quantity at full load. The speed constitutes the abscissa 2 and is plotted in terms of percentage of the rated speed of the engine 50. The broken line 3 indicates the minimum injection quantities which are necessary in order to prevent the engine 50 from stalling during idling. The point 4 identifies the normal idling speed. Below the line 3 is the stalling range where the engine 50 will not run on its own.

It will be observed from the ordinate 1 that the engine 50 requires about 50% more fuel for starting than at full load.

The graph of FIG. 2 constitutes a performance graph for the engine 50. In accordance with the invention, the performance graph is divided into a plurality of bands. The engine operating conditions in the various bands are different and the injection nozzle 59 is to produce fuel jet characteristics for each band which correspond to the particular operating conditions. In the illustrated embodiment, the performance graph is divided into four bands I, II, III and IV by lines 5, 6 and 7.

In the band I which is located in the lowermost speed range, it is desirable for the predominant part of the fuel to be injected into the combustion chamber 54 in the form of a finely atomized spray. The atomized fuel mixes with the air directly and does not deposit on the wall surrounding the combustion chamber 54. This wall is relatively cold in the lowermost speed range. On the other hand, in the band IV which is located in the uppermost speed range, it is desirable for the predominant part of the fuel to issue as a concentrated stream and deposit on the wall of the combustion chamber 54 which is now relatively hot. The fuel preferably deposits on the wall of the combustion chamber 54 in the form of a film. The deposited fuel evaporates from the wall of the combustion chamber 54, mixes with the air and then undergoes combustion. The characteristics of the fuel jet in the bands II and III are desirably intermediate those in the bands I and IV.

Appropriate fuel jet characteristics and good formation of an air-fuel mixture under all operating conditions may be achieved with an injection nozzle having a variable discharge area. An injection nozzle of this type makes it possible to obtain the relatively large discharge areas which are required in the upper load and/or speed range to produce a concentrated fuel stream. On the other hand, it is also possible to obtain the relatively small discharge areas which are required in the lower load and/or speed range to produce a finely atomized spray. Furthermore, such an injection nozzle enables the change in injection pressure, that is, the change in pressure at the discharge hole or opening, to be maintained relatively small over the entire performance range of the engine.

A throttling pintle nozzle represents a preferred form of injection nozzle for achieving variations in discharge area. At maximum lift or displacement of the pintle or needle of such a nozzle, the tip of the pintle, which may be frustoconical, exposes a discharge area which approximates that of an apertured nozzle having a fixed discharge area designed for operation at full load. The characteristics of the fuel jet which issues from a pintle nozzle at maximum lift are about the same as those of the fuel jet which issues from an apertured nozzle designed for operation at full load.

The discharge area of a pintle nozzle is small when the lift of the pintle is small so that the fuel is forced through the annular discharge passage under high pressure. As a result, the discharge velocity of the fuel is high and the fuel jet is highly atomized. Contrary to apertured nozzles designed for operation at full load, little or no throttling occurs upstream of the discharge passage in a pintle nozzle since the flow cross section in the region of the seat is several times larger than that in the discharge passage.

The degree to which the pintle nozzle is opened, that is, the amount of fuel injected, in each of the bands I-IV may be regulated via suitable conventional regulating means such as springs by appropriately matching the characteristics of the regulating means to pintle lift. In this manner, any desired variations in discharge area may be obtained. The system may be made self-regulating by properly coordinating the same with the hydraulic circuit for fuel injection.

An important objective of the invention is to generate different fuel jet characteristics in the different operating bands I-IV of the engine 50.

In order to achieve this objective, the invention employs an injection nozzle of variable discharge area and, in addition, makes use of the fact that the velocity of the combustion air varies with the speed of the engine 50.

At high engine speed and a correspondingly high air velocity, the relative velocity of the fuel and the combustion air is small. Little or no atomization of the fuel jet occurs so that little or no fuel mixes directly with the air in the form of a finely divided spray. The predominant part of the fuel is deposited on the wall of the combustion chamber 54 and subsequently rapidly evaporated due to the high air velocity.

As the engine speed is decreased, the air velocity decreases virtually in proportion while the discharge velocity of the fuel remains approximately the same. Accordingly, the relative velocity of the air and the fuel is large. This causes the fuel jet to be atomized to a greater extent so that more fuel is directly mixed with the air in the form of a finely divided spray and less fuel reaches the wall of the combustion chamber 54. The variation in fuel distribution with engine speed is desirable since, at very low air velocities such as are found in passenger cars where the range of engine speeds is very large, the fuel will not evaporate sufficiently rapidly from the wall of the combustion chamber 54 when the fuel film on the wall is thick.

Passenger cars operate at low load, that is, with small amounts of injected fuel, for a relatively large percentage of the time. Here, it is particularly important to regulate the fuel jet characteristics so that at least the predominant part of the fuel is atomized and mixes directly with the air at low load. The reason resides in the fact that the thermal portion of the energy required to form the air-fuel mixture decreases at low load due to the reduced process temperature and the reduced temperature at the wall of the combustion chamber 54. Thus, the invention provides for the amount of fuel deposited on the wall of the combustion chamber 54 to decrease and for the amount of fuel atomized by the injection nozzle to increase as engine load and speed decrease. Preferably, the characteristics of the fuel jet change gradually with engine load and speed.

Figure 3:
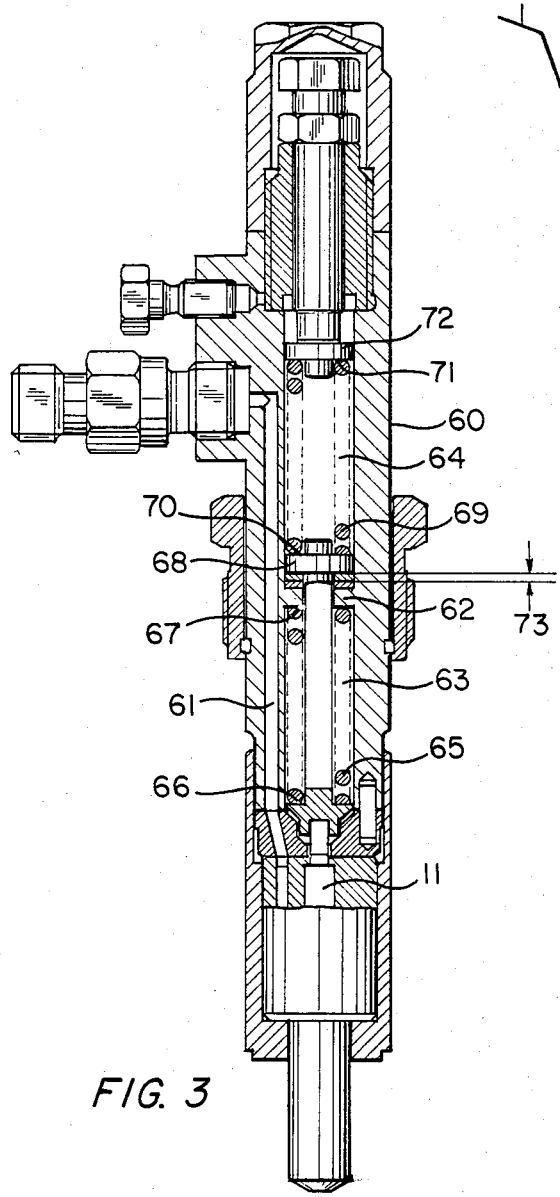
FIG. 3 is a cross-sectional view of one embodiment of a pintle nozzle.

FIG. 3 illustrates one embodiment of a pintle nozzle which may be used as the injection nozzle 59 in accordance with the invention. The pintle nozzle has an elongated housing or casing 60 which is provided with a fuel inlet passage 61. The fuel inlet passage 61 leads to a non-illustrated fuel discharge passage via which the fuel is injected into the combustion chamber 54. The discharge area of the fuel discharge passage is variable and controlled by a pintle or needle 11 accommodated in a chamber within the casing 60. The pintle 11 is movable axially of the casing 60 between a position in which the fuel discharge passage is closed and a plurality of positions in which the fuel discharge passage is open and has various effective cross-sectional areas for fuel flow.

An abutment 62 divides the chamber in the casing 60 into a pair of compartments 63 and 64. A spring 65 is located in the compartment 63 and surrounds the pintle 11. The spring 65 bears against a shoulder 66 on the pintle 11 as well as a shoulder 67 on the abutment 62. The spring 65 is prestressed and the amount of prestress determines the pressure which is necessary to open the pintle nozzle. This pressure is supplied by the fuel flowing through the fuel inlet passage 61, that is, the fuel exerts pressure on the pintle 11 in a sense urging the latter from its closed position to its open positions and lifts the pintle 11 from its non-illustrated seat when the fuel pressure is sufficiently high.

A piston 68 is mounted for movement in the compartment 64. A spring 69 is situated in the compartment 64 and bears against a shoulder 70 on the piston 68 as well as a shoulder 71 on an abutment 72 which is fixed relative to the casing 60. The spring 69 may or may not be prestressed. The pintle 11 extends through the abutment 62 separating the compartments 63 and 64.

When the pintle nozzle is closed, the pintle 11 is spaced from the piston 68 by a gap 73. The pintle 11 remains in its closed position until the fuel pressure in the fuel inlet passage 61 exceeds the prestress of the spring 65. Once this occurs, the pintle 11 is raised from its seat against the force of the spring 65 and fuel flows into the combustion chamber 54. When the pintle 11 has moved a distance equal to the width of the gap 73, the pintle 11 abuts against the piston 68. Further movement of the pintle 11 now occurs against the additional force exerted by the spring 69.

A pintle nozzle of the type shown in FIG. 3 is disclosed, for example, in the British Patent Specification No. 1,284,797 and the corresponding German Printed Publication No. 17 51 470.

Figure 4:
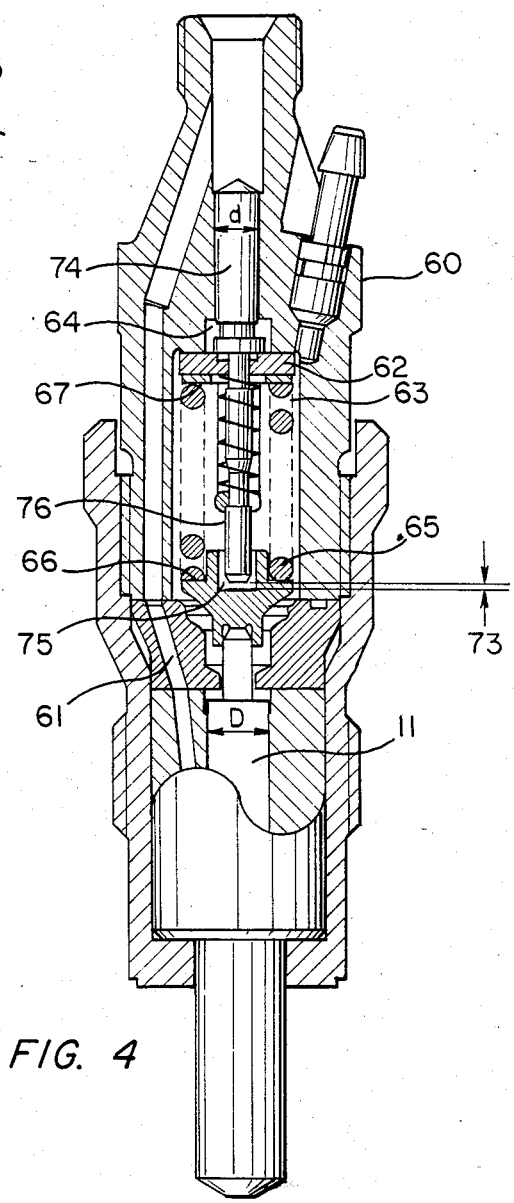
FIG. 4 is a cross-sectional view of another embodiment of a pintle nozzle.

Another embodiment of a pintle nozzle which may be employed as the injection nozzle 59 is illustrated in FIG. 4 where the same reference numerals as in FIG. 3 are used to identify similar elements.

The pintle nozzle of FIG. 4 differs from that of FIG. 3 primarily in that the spring 69 is replaced by a rod 74 which is movable axially of the pintle nozzle. The compartment 64 of FIG. 4 which accommodates the rod 74 communicates with the same fuel source as the fuel inlet passage 61 so that the rod 74 is exposed to the pressure of the fuel entering the pintle nozzle. The pintle 11 of FIG. 4 does not extend through the abutment 62 but is instead provided with a central recess 75. The recess 75 receives the end of a shaft 76 which extends through the abutment 62 and is fast with the rod 74. When the pintle nozzle is closed, the pintle 11 and the shaft 76 are separated by the gap 73.

The rod 74 has a diameter d which is smaller than the diameter D of the pintle 11. Accordingly, the total force exerted on the rod 74 by the incoming fuel is smaller than that exerted on the pintle 11.

The rod 74 serves a function similar to that of the spring 69 in FIG. 3. Assuming that the pressure of the incoming fuel is initially too low to lift the pintle 11 from its seat, the pintle 11 is held in its closed position by the spring 65. The rod 74 is urged against the abutment 62 by the fuel pressure.

When the fuel pressure rises sufficiently to overcome the prestress of the spring 65, the pintle 11 is lifted from its seat. The pintle 11 then moves a distance equal to the width of the gap 73 against the restoring force of the spring 65. After traversing the gap 73, the pintle 11 engages the shaft 76. Further movement of the pintle 11 is now additionally resisted by the force which the fuel exerts on the rod 74. Movement of the pintle 11 continues once the fuel pressure has increased to such a level that the total force exerted on the pintle 11 by the incoming fuel is sufficient to overcome the resistance offered by the rod 74. The continued movement of the pintle 11 occurs in dependence upon the characteristics of the spring 65 and the difference between the cross-sectional areas of the rod 74 and the pintle 11.

The diameter or cross-sectional area of the rod 74 is preferably selected in such a manner that the force with which the rod 74 resists movement of the pintle 11 at least equals the increase which occurs in the force tending to move the pintle 11 when the pintle 11 is lifted from its seat. In other words, when the pintle 11 is lifted from its seat, the area of the pintle 11 which previously engaged the seat becomes exposed to the fuel pressure. This results in an increase in the total force tending to move the pintle 11 away from its seat. The force with which the rod 74 resists movement of the pintle 11 is preferably at least equal to such increase.

A pintle nozzle of the type shown in FIG. 4 is disclosed, for example, in the British Patent Specification No. 1,447,065.

Another form of pintle nozzle is disclosed in the British Patent Specification No. 1,598,520 and its corresponding German Printed Publication No. 27 11 389.

Figure 5:
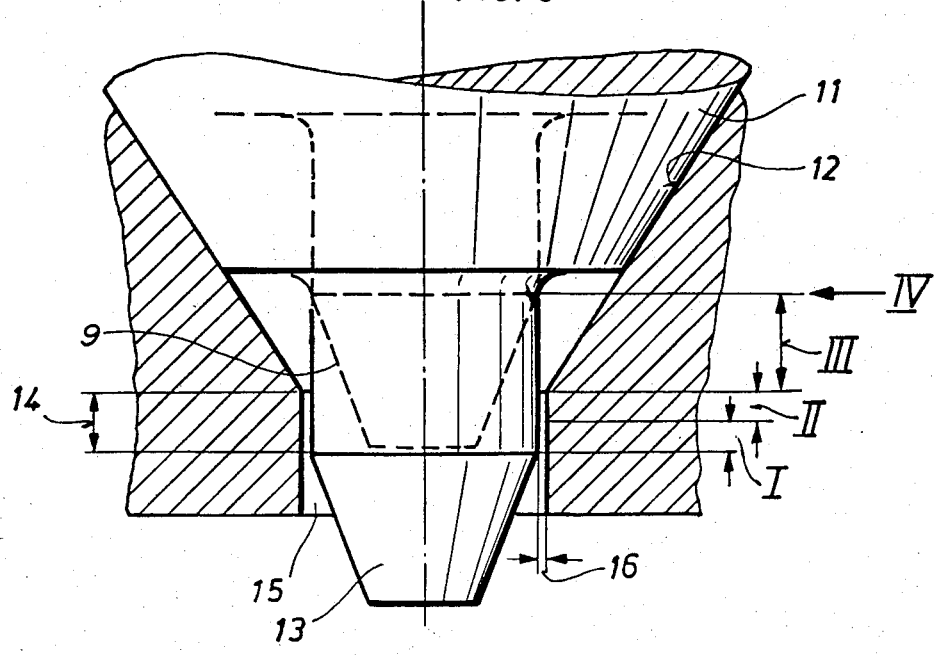
FIG. 5 is an enlarged cross-sectional view of the fuel discharge region of the pintle nozzles illustrated in FIGS. 3 and 4.

FIG. 5 shows the fuel discharge region of the pintle nozzles illustrated in FIGS. 3 and 4. The pintle 11 has a frustoconical configuration in the discharge region and the latter is formed with a matching conical seat 12 against which the pintle 11 abuts in its closed position. Downstream of the seat 12 as considered in the direction of fuel flow is a cylindrical discharge passage 15 via which the fuel is discharged into the combustion chamber 54.

The pintle 11 terminates in a throttling tip which includes a cylindrical portion 9 and a frusto-conical portion 13. The diameter of the cylindrical portion 9 is smaller than that of the discharge passage 15 so that the cylindrical portion 9 and the discharge passage 15 together define an annular throttling gap 16 in the closed position of the pintle 11. The positions of the cylindrical portion 9 and the frusto-conical portion 13 of the pintle tip in the closed position of the pintle 11 are shown in full lines while the positions of the portions 9 and 13 in the fully open position of the pintle 11 are shown in dashed lines. In the closed position of the pintle 11, a region of overlap 14 exists between the discharge passage 15 and the cylindrical portion 9 of the pintle tip. Although FIG. 5 illustrates an example of a suitable pintle tip, other shapes are possible. However, an overlap 14 should always be present, and all pintle tips should have a portion such as the frusto-conical portion 13 of more or less rapidly decreasing diameter or cross-sectional area in order to insure that the desired function described herein is obtained.

Figure 6:
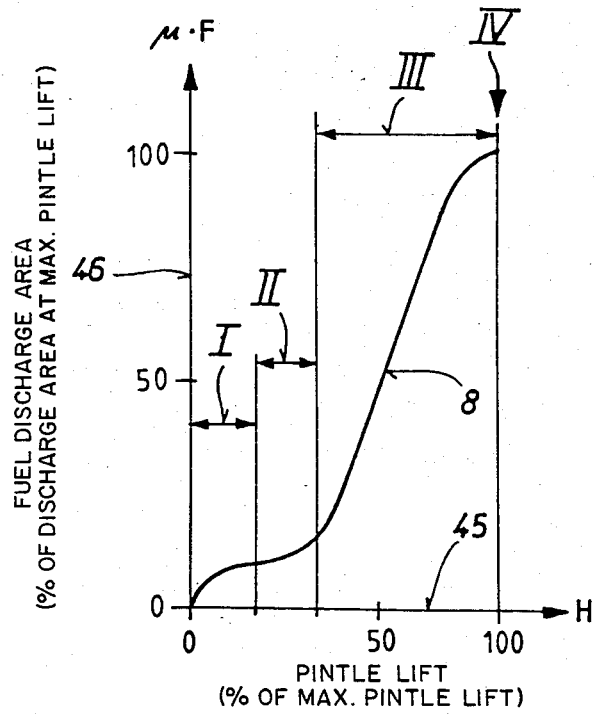
FIG. 6 is a plot of fuel discharge area versus pintle lift.

FIG. 6 is a plot of pintle displacement or lift (H) versus fuel discharge area $\mu.F$. Here, $\mu$ is the discharge coefficient of the discharge passage 15 while F is the geometric cross-sectional area. Pintle displacement is plotted on the abscissa 45 in terms of percent of the maximum displacement while discharge area is plotted on the ordinate 46 in terms of percent of the discharge area at maximum pintle displacement. A characteristic line 8 is obtained and, depending upon the desired conditions, may be curved as shown or may be straight. The characteristic line 8 is a function of the type of injection nozzle used and the parameters of the discharge passage 15. Preferably, the configuration of the characteristic line 8 is such that, as shown, the rate of change of the discharge area in the upper range of engine load and/or speed is generally substantially higher than that in the lower range of engine load and/or speed.

With reference to FIGS. 2, 5 and 6, the displacement of the pintle 11 in the operating bands I and II of the engine 50, that is, in the low range of engine load and/or speed, is small. In the band I, the cylindrical portion 9 of the pintle tip remains in the discharge passage 15. The displacement of the pintle 11 is approximately 50% of the overlap 14. The pressure at the throttling gap 16 is high and the annular fuel jet is accordingly well-atomized.

In the band II, the end of the cylindrical portion 9 of the pintle tip may rise to the inlet end of the discharge passage 15 beyond which the latter no longer overlaps the cylindrical portion 9. The pressure at the throttling gap 16 is still relatively high and good atomization of the fuel jet continues to occur.

FIG. 6 shows as an example that the band II terminates at a pintle displacement equal to approximately 30% of the maximum pintle displacement. It is further seen from the characteristic line 8 in FIG. 6 that the discharge area in the bands I and II varies between about 3 and 15% of the discharge area at maximum pintle displacement. In the event that the characteristic line 8 has a shape different from that illustrated in FIG. 6, the lines in FIG. 6 delimiting and indicating the maximum pintle displacement in each of the bands I–III will assume different positions. The shift in positions takes place in such a manner that the discharge area at each of the delimiting lines remains unchanged. In other words, for each of the bands I–III, the discharge area at maximum pintle displacement remains constant as the characteristic line 8 changes.

Returning to FIGS. 2 and 5, the band III involves travel of the end of the cylindrical portion 9 of the pintle tip between the inlet end of the discharge passage 15 and the full open position indicated by dashed lines. The discharge area increases continuously with increasing pintle displacement H as seen from FIG. 6 and the fuel jet becomes progressively more concentrated, i.e., the degree of atomization is progressively reduced.

In the band IV, the pintle 11 is in the full open position during the major portion of the injection cycle. The fuel jet remains concentrated and the predominant part of the fuel reaches the wall of the combustion chamber 54.

The maximum discharge area is a function of the length of the injection cycle and of the injection pressure desired at maximum output.

It will be recalled here that the degree of atomization of the fuel jet depends not only on the absolute magnitude of the velocity at which the fuel is discharged from the discharge passage 15 but also on the relative velocity of the fuel and the air swirling in the rotationally symmetric combustion chamber 54.

Matching of the fuel jet characteristics or, in other words, the position of the pintle 11 and hence the magnitude of the discharge area, to the various operating modes or bands I–IV of the engine 50 is preferably achieved via the structures of FIGS. 3 and 4. These structures make it possible to obtain a stiffness which increases discontinuously, i.e. stepwise, or continuously with increasing pintle displacement. Although a constant stiffness may be sufficient in some cases, an increasing stiffness is desirable where the position of the pintle 11 at small pintle displacements is to be controlled with a relatively high degree of precision or where an uncontrolled, rapid movement of the pintle 11 at low engine speeds and loads after the pintle nozzle is opened is to be prevented. In FIG. 3, an increasing stiffness is achieved by employing a spring 69 in addition to the spring 65 which urges the pintle 11 to its closed position. In FIG. 4, an increasing stiffness is obtained via the rod 74 which is used in addition to the spring 65 and may be considered as a resilient hydraulic element. The rod 74 may exert a force on the pintle 11 which is proportional to the pressure in the fuel line.

In all cases, movement of the pintle 11 is associated with a change in fuel injection pressure. However, variation of the discharge area in accordance with the invention counteracts the tendency for changes in fuel injection pressure to occur. Consequently, the pressure change at the discharge passage 15 over the range from the minimum to the maximum amount of injected fuel may be held to a relatively small value as compared to conventional injection with a nozzle having a non-varying discharge area.

Another manner of regulating pintle displacement as a function of the operating mode of the engine 50 is to use a separately controlled actuating element. Here, injection can be effected at a constant pressure throughout the range of engine performance. It is even possible to make the pressure at low engine loads and speeds greater than that at high engine loads and speeds which is advantageous under certain circumstances.

Referring once more to FIG. 2, the lines 5–7 which divide the performance range of the engine 50 into the bands I–IV are lines of constant pintle displacement or constant discharge area. Stated differently, the ratio between the amount of fuel which is deposited on the wall of the combustion chamber 54 and the amount of fuel which is atomized is constant along each of the lines 5–7. The positions of the lines 5–7, and accordingly the variation in the characteristics of the fuel jet over the performance range of the engine 50, can be adjusted by appropriate selection of the parameters of the injection nozzle 59. For the embodiment of FIG. 3, the positions of the lines 5–7 can be varied by changing the characteristics and prestress of the springs 65 and 69. This means that a predetermined variation in the characteristics of the fuel jet over the performance range of the engine 50 can be obtained by selecting the characteristics and prestress of the springs 65 and 69 so as to obtain a corresponding variation in pintle displacement and discharge area. Similarly, for the embodiment of FIG. 4, the positions of the lines 5–7 can be shifted by varying the diameter of the rod 74.

The manner in which the performance range of the engine 50 is divided into bands depends upon the intended use of the engine 50, that is, upon the range of engine speeds as well as the emission standards and output requirements imposed upon the engine 50. The band or bands which encompass the most frequent operating conditions of the engine 50 are chosen to be wider than the remaining bands. In other words, the division of the performance range is performed in such a manner that the engine 50 is capable of operating with fuel jet characteristics which are designed for the most frequent operating conditions thereof and/or for operating conditions imposed by legislation.

The division in FIG. 2 indicates that the engine 50 is here intended to be used mainly in motor vehicles which operate predominantly in city traffic. If the engine 50 were, for instance, instead intended to operate in the full load range for a large percentage of the time, the lines 5–7 would be shifted to the left. The plot of FIG. 2 also remains qualitatively the same if, for example, more stringent emission requirements were imposed on uncombusted hydrocarbons and blue smoke. In this case, the bands I and II are preferably widened while the bands III and IV are narrowed.

FIGS. 7–11 are plots of possible characteristic lines for resilient systems which may act upon the pintle 11 so as to regulate the latter in accordance with the division of the performance range as in FIG. 2. In each of FIGS. 7–11, the ordinate 23 represents the force F which the resilient system exerts on the pintle 11. $F_o$ designates the force which is exerted on the pintle 11 in its closed position, i.e. at zero pintle displacement. The abscissa 47 in each of FIGS. 7–11 represents pintle displacement or lift (H).

The characteristic lines 17 and 18 in FIGS. 7 and 8 may be obtained with two springs such as the springs 65 and 69 of FIG. 3 which are arranged in series. It will be observed from FIGS. 7 and 8 that the pintle 11 initially moves against the resistance of the spring 65 only. The dashed line 24 in each case constitutes the characteristic line of the spring 65. The spring 69 comes into play additionally only after a predetermined amount of pintle displacement has occurred. With reference to FIG. 5, the predetermined pintle displacement may, for example, equal 50% of the overlap 14 between the discharge passage 15 and the cylindrical portion 9 of the pintle tip. Under these circumstances, the spring 69 comes into play only at the end of the band I. The characteristic line 17 is obtained by installing the spring 69 without prestress while the characteristic line 18 is obtained by prestressing the spring 69.

FIG. 9 shows the characteristic line 19 for a steel spring. The characteristic line 19 is continuous over the range from zero to maximum pintle displacement.

Figure 10:
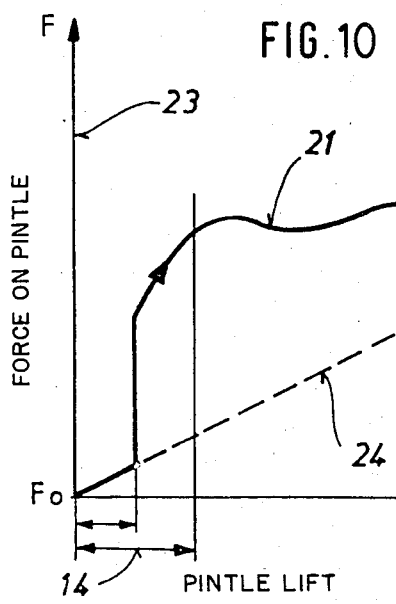
FIG. 10 is a plot of the force on the pintle versus pintle lift in accordance with an additional embodiment of the invention.
Figure 11:
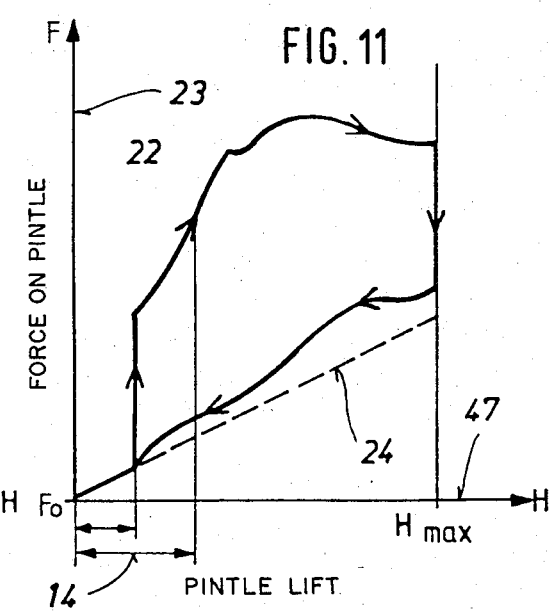
FIG. 11 is a plot of the force on the pintle versus pintle lift according to yet another embodiment of the invention.

The characteristic lines 21 and 22 of FIGS. 10 and 11 may be obtained with a system in which a spring such as the spring 65 acts on the pintle 11 and a resilient hydraulic element such as the rod 74 of FIG. 4 exerts an additional force proportional to the fuel injection pressure on the pintle 11. The variation of the force F with pintle displacement H, that is, the shape of the characteristic line 21 or 22, is similar to that of the injection pressure during opening of the pintle nozzle and is a function of engine speed as well as injection quantity. As is the case for the spring 69 in the dual spring system of FIG. 3, the hydraulic element or rod 74 may come into play only after the pintle 11 has undergone a predetermined displacement, e.g. a displacement equal to 50% of the overlap 14 illustrated in FIG. 5.

FIG. 11 shows that the force F during movement of the pintle 11 towards its closed position may vary differently than the force F during movement of the pintle 11 towards its full open position.

In FIGS. 7, 8, 10 and 11, the point at which the spring 69 or the rod 74 comes into play is always the same. This point may, however, be advanced or retarded. For instance, the pintle nozzle may be designed so that the spring 69 or rod 74 comes into play when the end of the cylindrical portion 9 of the pintle tip has almost reached the inlet end of the discharge passage 15, that is, the pintle nozzle may be designed so that the band II in FIGS. 5 and 6 becomes very narrow and the band I is enlarged. The point at which the spring 69 or rod 74 comes into play should be determined on a case-by-case basis.

It may be seen that an important feature of the invention resides in the use of a specific type of injection nozzle which, as illustrated in FIGS. 7–11, exhibits very specific characteristics during opening. The injection nozzle, which is preferably a throttling pintle nozzle, is regulated in such a manner as to achieve desired, precisely controlled injection characteristics in fixed but freely selected bands of the performance range of the engine 50. The generation of different fuel jet characteristics, that is, the attainment of a greater degree of fuel atomization or a greater degree of fuel deposition on the wall of the combustion chamber 54, is accomplished by controlling the dwell time of the pintle tip in a desired position corresponding to a specified discharge area.

In FIG. 12, both the injection pressure and the pintle displacement or lift H in each of the bands I-IV are plotted as a function of piston travel near top dead center OT. The left-hand ordinates 25 represent pintle displacement or lift in terms of percent of maximum pintle displacement. The righthand ordinates represent the ratio p of injection pressure to nozzle opening pressure as a percentage. The abscissa 26 represents piston travel s near top dead center OT in terms of degrees crank angle. The curve 27 in each case shows the variation of injection pressure with piston travel s while the curve 28 in each case shows the variation of pintle displacement H with piston travel s.

In the band I, the maximum pintle displacement is approximately 50% of the overlap 14 between the discharge passage 15 and the cylindrical portion 9 of the pintle tip. In this connection, reference may be had to FIG. 5. The injection pressure is relatively high.

In the band II, the maximum pintle displacement is such that the end of the cylindrical portion 9 of the pintle tip reaches the region of the inlet end of the discharge passage 15. In other words, the maximum distance moved by the pintle 11 is such that the cylindrical portion 9 reaches a point where it just ceases to overlap the discharge passage 15. The injection pressure is again relatively high.

In the band III, the end of the cylindrical portion 9 of the pintle tip moves to positions upstream of the inlet end of the discharge passage 15 while in the band IV the pintle 11 reaches the fully open position. Although the maximum injection pressure rises in passing from the band I to the band IV, it will be observed that the pressure increase in passing from the band III to the band IV is substantially smaller than that in passing from the band I to the band II. Thus, while a significant difference exists between the maximum injection pressures in the bands I and II, a relatively insignificant difference exists between the maximum injection pressures in the bands III and IV.

It is preferred for the maximum injection pressure attained throughout the entire performance range of the engine 50 to be only about 2 to 3 times as high as the nozzle opening pressure, that is, the pressure required to open the injection nozzle 59. By way of comparison, an injection nozzle designed for idling and having a constant discharge area would, at full load and high engine speed, require an injection pressure equal to approximately 10 times the nozzle opening pressure in order to maintain the length of the injection cycle sufficiently short.

The discharge areas of the injection nozzle 59 at no load and full load preferably differ by a factor of approximately 10.

According to a preferred embodiment of the invention, the injection rate at idle or in the low range of engine load and/or speed is approximately $1 \pm 0.5$ mm$^3$ per degree of crank angle and liter of piston-swept volume. This injection rate is relatively low. For small engines, the conventional injection quantity at idle or in the low range of engine load and/or speed is 3 to 4 mm$^3$ per degree of crank angle and liter of piston-swept volume when using an apertured nozzle having a constant discharge area. Under the same conditions, the conventional injection quantity for large engines is 10 to 12 mm$^3$ per degree of crank angle and liter of piston-swept volume. It is further favorable for the injection rate in accordance with the invention to be of the order of $2 \pm 1$ mm$^3$ per degree of crank angle and liter of piston-swept volume at full load and rated speed.

It is advantageous to adjust the injection timing, that is, the instant at which injection begins, as a function of engine speed. The reason for this is as follows:

The injection nozzle 59 is opened by a pressure wave which travels through the fuel lines at the speed of sound. The travel time of the pressure wave is independent of the engine speed or, in other words, remains constant as the engine speed varies. It follows that, in relation to the position of the piston 53, the injection nozzle 59 will open later at high engine speeds than at low engine speeds. However, optimum combustion in engines, and particularly diesel engines, takes place only at a specific piston position corresponding to a predetermined crank angle. Optimum combustion conditions are those which result in maximum output and minimum harmful emissions. Since optimum combustion occurs at a predetermined crank angle while opening of the injection nozzle 59 is retarded relative to this crank angle as engine speed increases, it is recommended that injection timing be advanced with increasing engine speed.

The characteristics of the fuel jet change not only as a function of engine speed but also as a function of engine load. As a consequence, the ignition lag, the manner in which the fuel mixes with the combustion air and the rate of combustion all vary with engine load as well as with engine speed. It is therefore desirable to adjust the injection timing as a function of engine load in addition to engine speed so as to cause the release of heat to take place with optimum efficiency. This enables the generation of noise in the range of partial loads, as well as at low loads and idle, to be suppressed. On the one hand, this is due to the fact that the injection rate at the start of injection is relatively low so that the amount of fuel which undergoes self-ignition is very small. On the other hand, noise suppression is enhanced because better distribution of the fuel in the combustion air occurs thereby accelerating formation of the fuel-air mixture and permitting injection timing to be retarded. The maximum pressure during combustion is reduced and an improvement of 50% in $NO_x$ emissions is obtained without sacrifice in specific fuel consumption.

Retardation of injection timing in the low load range provides the advantage that no fuel particles are able to settle at the bottom of the combustion chamber 54 and thereby escape combustion. A similar effect is obtained by the relative position of the discharge passage 15 and the combustion chamber 54 proposed in accordance with the invention, and injection timing retardation complements such relative position.

The change in injection timing as a function of load is preferably between about 20 and 50% of conventional speed-dependent timing adjustment at full load. This applies over the range from full load to no load and at rated speed of the engine 50. The load-dependent timing adjustment advantageously remains substantially constant between rated speed and idling.

FIG. 13 is a plot of injection timing change or adjustment (S) versus engine speed (n). The ordinate 29 represents injection timing adjustment as a percent of the maximum possible adjustment while the abscissa 31 represents engine speed in terms of percent of rated speed.

The straight line 32 in FIG. 13 indicates the timing adjustment which is required along the full load curve. The lines 33 and 34 delimit the region in which the curve representing the start of injection lies at "zero" injection rate. As the load decreases, the start of injection shifts in the direction indicated by the arrow 35.

The mathematical relationship governing the change in injection timing with load at constant speed is illustrated in FIG. 14. The ordinate 36 represents the angular adjustment (alpha) as a percent of the maximum load-dependent timing adjustment at a given constant engine speed. Thus, alpha is defined as follows:

$$alpha = \frac{(a_{full\ load} - a)}{a_{full\ load} - a_0)} \cdot 100,$$

where
$a$full load is the angle at which injection begins at full load
$a_0$ is the angle at which injection begins at zero injection quantity
a is the instantaneous angle at which injection begins.
The abscissa in FIG. 14 represents the injection quantity ($q_e$) in terms of percent of the injection quantity at full load.

As indicated by the line 38, the change in injection timing may vary approximately linearly between the point representing "zero" timing adjustment (alpha=0) and full load injection quantity ($q_e$=100%) and the point representing 100% timing adjustment (alpha=100%) and zero injection quantity ($q_e$=0). In certain cases, however, it is advantageous to effect little or no timing adjustment at high injection quantities. Instead, as indicated by the curve 39, adjustment of injection timing is effected when the injection quantity is below a preselected value while the start of injection is maintained at or near "full load" when the injection quantity exceeds such a value.

The possible operating points on the plot of FIG. 14 lie between two pairs of substantially parallel lines. The lines of one pair are parallel to the abscissa 37 and include a line which lies on the same and runs from the point representing zero timing adjustment (alpha=0) and 50% full load injection quantity ($q_e$=50%) to the point representing zero timing adjustment (alpha=0) and full load injection quantity ($q_e$=100%). The other of the lines paralleling the abscissa 37 lies at a level of 100% timing adjustment (alpha=100%) and runs from the point representing 100% timing adjustment (alpha=100%) and zero injection quantity ($q_e$=0) to the point representing 100% timing adjustment (alpha=100%) and 50% full load injection quantity ($q_e$=50%). The second pair of lines bounding the possible operating points on the plot of FIG. 14 include a line 42 running from the point representing 100% timing adjustment (alpha=100%) and 50% full load injection quantity ($q_e$=50%) to the point representing zero timing adjustment (alpha=0) and full load injection quantity ($q_e$=100%). The other line of the second pair is a line 43 running from the point representing 100% timing adjustment (alpha=100%) and zero injection quantity ($q_e$=0) to the point representing zero timing adjustment (alpha=0) and 50% full load injection quantity ($q_e$=50%). The line 43 illustrates the boundary case in which the start of injection remains constant between 50% full load injection quantity ($q_e$=50%) and full load injection quantity ($q_e$=100%). On the other hand, the line 42 illustrates the boundary case in which load-dependent timing adjustment remains constant from zero injection quantity ($q_e$=0) to 50% full load injection quantity ($q_e$=50%).

The line 41 and curve 44 in FIG. 14 indicate further possible variations of timing adjustment with injection quantity within the confines of the lines 42 and 43.

An important advantage of the invention resides in that accelerated and substantially complete combustion occurs in the lower range of engine load and speed. This causes uncombusted hydrocarbons in the exhaust gas to be substantially reduced and also results in noise reduction as well as a reduction in $NO_x$ emissions. These effects may be explained as follows:

The mode of formation of the air-fuel mixture over the range from high engine load and speed to low engine load and speed changes from one in which the predominant part of the fuel deposits on the wall of the combustion chamber 54 to one in which the predominant part of the fuel is highly atomized and mixes directly with the air. This change in the mode of formation is accomplished by drastically reducing the discharge area of the injection nozzle 59 in the lower range of engine load and speed. The injection period, that is, the time required to inject the fuel into the combustion chamber 54, is here much longer than the injection period for a nozzle having an invariable discharge area. For instance, the injection period in the lower idling range may be equivalent to 10° of crank angle in accordance with the invention as compared to 1° of crank angle when using an injection nozzle having a non-varying discharge area. Consequently, the injection rate according to the invention is lower than conventional injection rates and the ignition lag is shorter due to the improved atomization of the fuel. It follows that a smaller proportion of the injection fuel is prepared for combustion at the instant of ignition. The pressure slope (gradient) during combustion is smaller than previously. For example, the pressure slope in accordance with the invention may lie in the range of 1 to 2 bars per degree of crank angle.

The shortened ignition lag and, above all, the accelerated progress of combustion permit the start of injection in the lower load range to be delayed as discussed earlier. This enables a further reduction in noise levels and $NO_x$ emissions to be achieved with essentially no decrease in fuel consumption and essentially no increase in hydrocarbon emissions. It is for this reason that load-dependent fuel injection timing adjustment is advantageously employed in addition to speed-dependent timing adjustment. As is seen from FIG. 14, the start of injection may be set continuously later in progressing from full load to no load and may be adjusted by a relatively large amount. It has already been mentioned that the change in injection timing as a function of load is preferably in the range of about 20 to 50% of conventional speed-dependent timing adjustment at full load. Such range is identified in FIG. 13.

Figure 15:
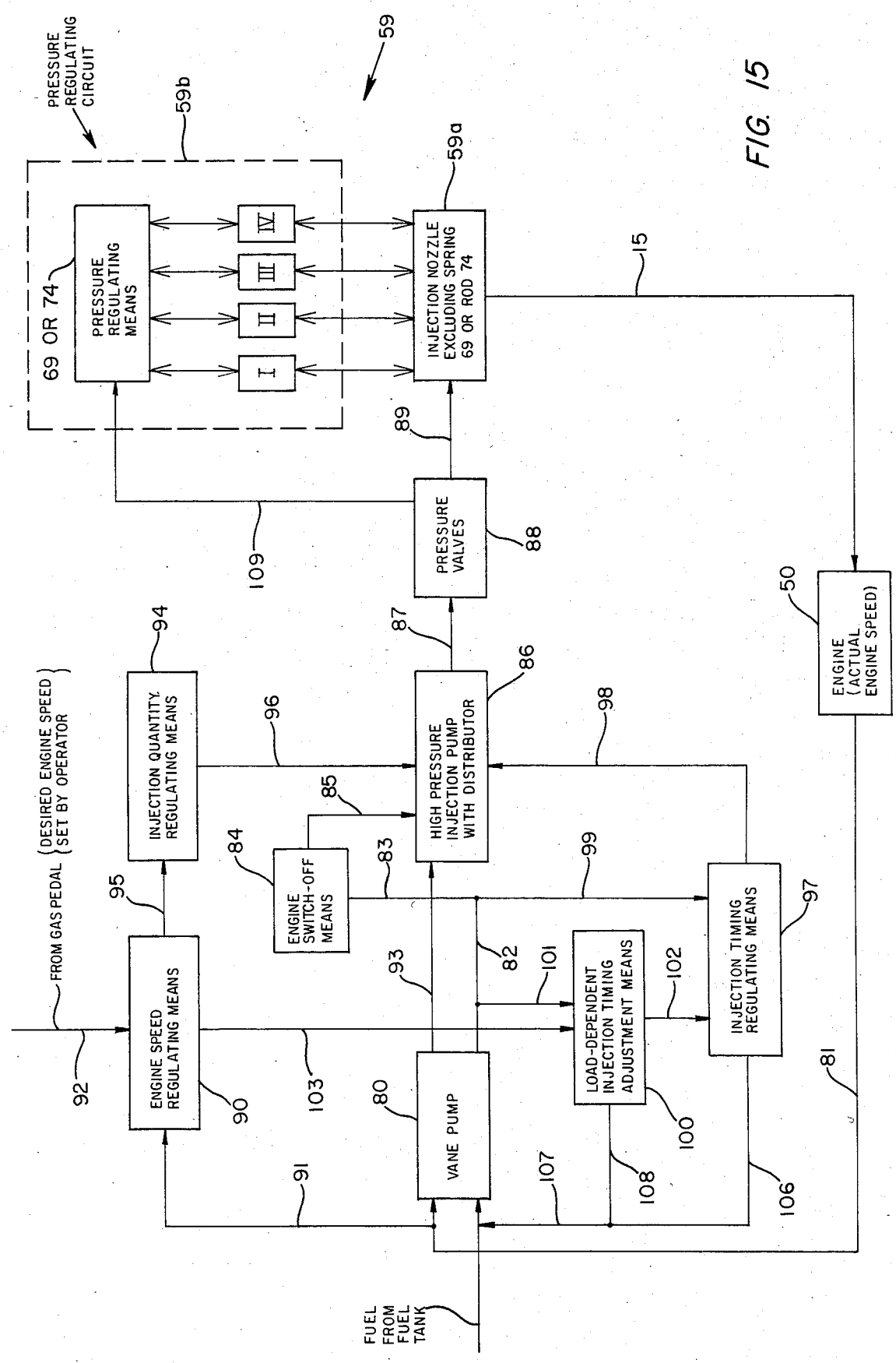
FIG. 15 diagrammatically illustrates a fuel injection system in accordance with the invention.
Figure 16:
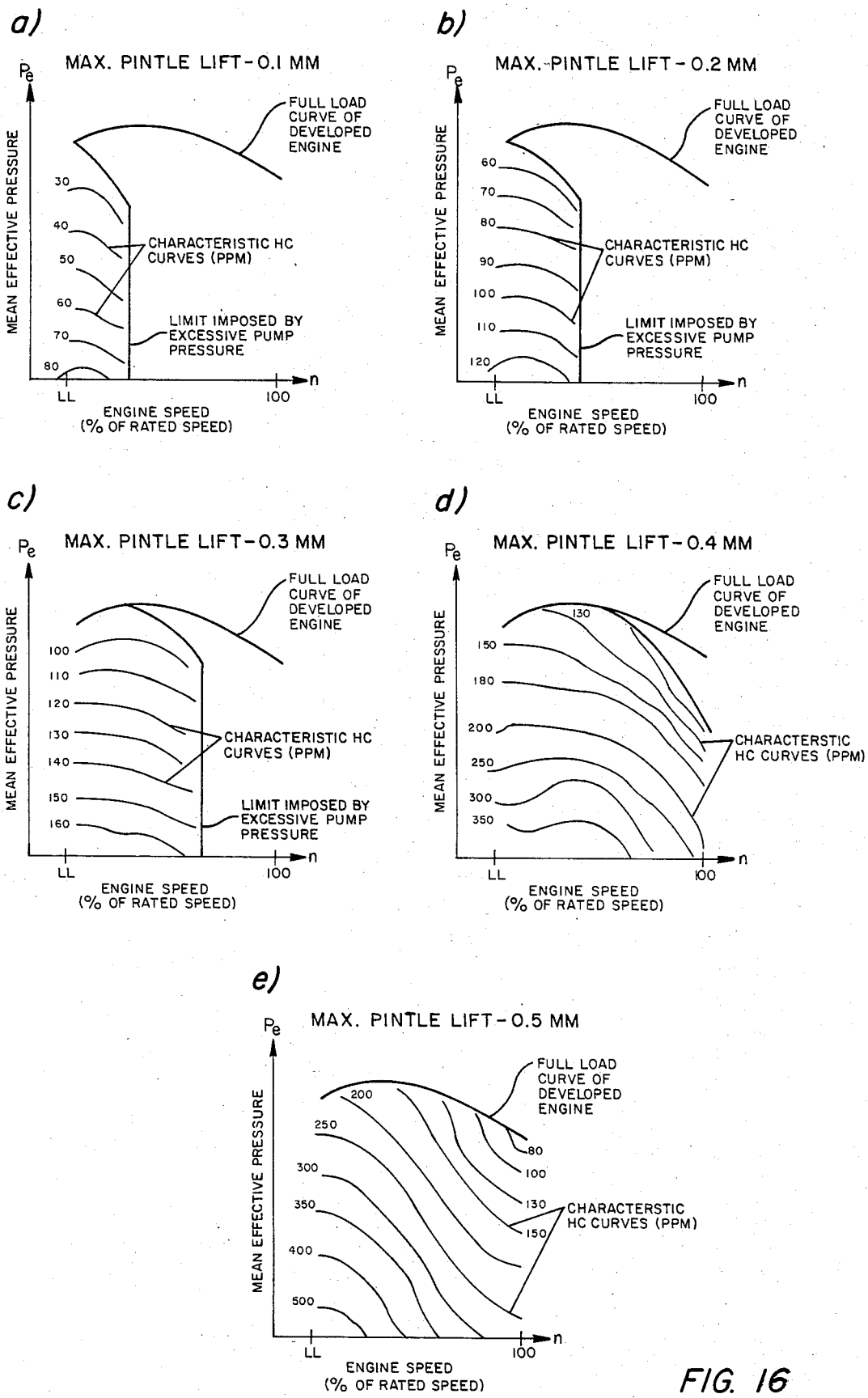
FIGS. 16a-through-e is a plot of the concentration of uncombusted hydrocarbons in the exhaust gas versus engine speed at different pintle lifts.

FIG. 15 illustrates an arrangement in accordance with the invention which may be used to generate different fuel jet characteristics in the bands I–IV of the performance range of the engine 50. The engine 50 is here assumed to be a diesel engine which powers a motor vehicle.

The arrangement of FIG. 15 includes a vane pump 80 which draws fuel from the non-illustrated fuel tank of the motor vehicle. The vane pump 80 is driven by the engine 50 at the instantaneous speed of the latter via an appropriate mechanical connection 81. The fuel sucked out of the fuel tank by the vane pump 80 is forwarded to a hydraulic pressure line 82 which communicates with a further hydraulic pressure line 83. The hydraulic line 83 leads to an engine switch-off means 84 which, in turn, communicates with a hydraulic pressure line 85 opening into a high-pressure fuel injection pump 86 equipped with a distributor.

As is the case for the vane pump 80, the injection pump 86 is driven by the engine 50 at the instantaneous speed thereof. To this end, the injection pump 86 is connected with the vane pump 80 by means of a directly speed-dependent connection 93. The function of the injection pump 86 is to inject predetermined amounts of fuel into the combustion chamber 54 of the engine 50 at specific times. Normally, fuel is to be injected into the combustion chamber 54 towards the end of each compression stroke. The amount of fuel injected into the combustion chamber 54 is matched to the operating conditions of the engine 50, and all of the cylinders 52 of the latter should be supplied with the same quantity of fuel.

The engine switch-off means 84 serves to block and unblock the flow of fuel to the injection pump 86. When the operator of the motor vehicle switches off the ignition, the engine switch-off means 84 terminates the flow of fuel to the injection pump 86 so that the engine 50 stops running. On the other hand, when the operator switches on the ignition, the switch-off means 84 establishes communication between the vane pump 80 and the injection pump 86 thereby enabling the engine 50 to be supplied with fuel. The switch-off means 84 may be electrically operated and may, for example, comprise a solenoid valve.

The injection pump 86 distributes the fuel, that is, divides the fuel into a number of streams equalling the number of cylinders 52 of the engine 50, and pumps the distributed fuel through hydraulic pressure and flow control lines 87 to a series of pressure valves 88 equal in number to the cylinders 52. After passing through the pressure valves 88, the fuel enters the injection nozzles 59 via hydraulic pressure and flow control lines 89. The fuel is then injected into the combustion chambers 54 of the cylinders 52 via the respective fuel discharge passages under the influence of the pressure generated by the injection pump 86.

The pressure valves 88 function to separate the pressure and flow control lines 89 leading to the injection nozzles 59 from the high-pressure circuit of the injection pump 86 and to relieve the pressure and flow control lines 89. This insures that the injection nozzles 59 close immediately and reliably when injection is terminated, and that no fuel subsequently drips into the combustion chambers 54.

As discussed earlier, a preferred form of injection nozzle 59 is the pintle nozzle. The latter is a fluid-regulated nozzle in which the pintle 11 is urged against the seat 12 by a relatively large prestress. A pressure chamber is formed in the pintle nozzle upstream of the seat 12, and the pintle 11 has a portion which projects into the pressure chamber and is preferably of conical configuration. The fuel coming from the injection pump 86 distributes itself about the pressure chamber and opens the nozzle by exerting pressure against the portion of the pintle 11 which projects into the pressure chamber.

The injected quantity of fuel is regulated by comparing the actual speed of the engine 50 with the desired speed as determined by the position of the gas pedal which is established by the operator of the vehicle. This comparison is performed in an engine speed regulating means 90. The engine speed regulating means 90 may, for instance, be a mechanical device which is designed to operate on the basis of the flywheel force. The actual engine speed is delivered from the engine 50 to the engine speed regulating means 90 via the mechanical connection 81 and a directly speed-dependent connection 91. The desired engine speed is fed from the gas pedal to the engine speed regulating means 90 via a connection 92. The engine speed regulating means 90 generates a signal which is a function of the difference between the actual and desired engine speeds.

The signal generated by the engine speed regulating means 90 is delivered to an injection rate regulating means 94 via a connection 95. The injection rate regulating means 94 transforms this signal and generates a further signal which is sent to the injection pump 86 by means of a connection 96. The latter signal determines the amount of fuel delivered by the injection pump 86.

The speed of the diesel engine 50, which is to be controlled via the gas pedal, should be maintained within a predetermined range which depends upon its application. The engine speed should not be unduly below or above this range. In order to maintain the engine speed within the required range under conditions of varying load, the amount of fuel delivered to the engine 50 must be matched to the torque which is to be supplied by the engine 50. This function is performed by the engine speed regulating means 90. It is to be observed that the engine speed regulating means 90 regulates engine speed by adjusting the amount of injected fuel.

The engine speed regulating means 90 serves to set an upper limit on the speed of the engine 50. This is important in order to prevent the engine 50 from self-destructing. The engine speed regulating means 90 may further be used to maintain the speed of the engine 50 constant at preselected values within the entire range from idling speed to rated speed.

Injection timing regulating means 97 is provided to adjust the instant at which the injection pump 86 delivers fuel to the injection nozzles 59 during each cycle. Adjustment of injection timing is achieved by a mechanical adjusting signal which is delivered from the injection timing regulating means 97 to the injection pump 86 via a mechanical connection 98.

The injection timing regulating means 97 receives a speed-dependent control signal, as well as a load-dependent control signal, from the vane pump 80. These control signals are in the form of hydraulic pressure and control delivery of the adjusting signal from the injection timing regulating means 97 to the injection pump 86.

The speed-dependent control signal is transmitted directly from the vane pump 80 to the injection timing regulating means 97 through the hydraulic pressure line 82 as well as a further hydraulic pressure line 99. Since the hydraulic pressure constituting the speed-dependent control signal changes as the engine speed changes, a change in engine speed results directly in an adjustment of injection timing.

The load-dependent control signal arrives at the injection timing regulating means 97 indirectly via a load-dependent injection timing adjustment means 100 which is connected with the vane pump 80 through the hydraulic pressure line 82 and another hydraulic pressure line 101. An additional hydraulic pressure line 102 leads from the load-dependent injection timing adjustment means 100 to the injection timing regulating means 97. The load-dependent control signal is transmitted to the injection timing regulating means 97 through the hydraulic pressure line 102.

The load-dependent injection timing adjustment means 100 is connected with the engine speed regulating means 90 by a connection 103. When the operator of the vehicle changes the position of the gas pedal, the engine speed changes. The change in engine speed, which is indicative of a change in load, results in an adjustment of the engine speed regulating means 90 via the connection 92. The engine speed regulating means 90, in turn, delivers a signal to the load-dependent injection timing adjustment means 100. The latter is designed to vary the hydraulic control signal generated in the hydraulic pressure line 101 as a function of the load. After being modified in the load-dependent injection timing adjustment means 100, the hydraulic control signal generated in the hydraulic pressure line 101 is transmitted to the injection timing regulating means 97 through the hydraulic pressure line 102. As a result, the instant at which fuel injection begins varies with load.

The injection timing regulating means 97 is connected with the inlet of the vane pump 80 via hydraulic lines 106 and 107 while the load-dependent injection timing adjustment means 100 is connected with the inlet of the vane pump 80 by means of the hydraulic line 107 as well as a hydraulic line 108. The hydraulic lines 106-108 enable the fuel which delivers the hydraulic control signals to be withdrawn from the injection timing regulating means 97 and the load-dependent injection timing adjustment means 100.

The injection timing regulating means 97 is generally used in engines having a wide range of engine speeds, e.g., high rpm motor vehicle engines, and/or engines having long hydraulic pressure lines. Speed-dependent timing adjustment involves advancing the instant at which injection begins with increasing engine speed. By advancing the start of injection as the engine speed increases, the injection timing regulating means 97 makes it possible to obtain optimum output and fuel consumption as well as minimum harmful emissions.

Load-dependent timing adjustment is performed by retarding the start of injection with decreasing load. This enables reductions in noise and $NO_x$ emissions to be achieved in the emission cycle.

The vane pump 80; engine switch-off means 84; injection pump 86; pressure valves 88; engine speed regulating means 90; injection rate regulating means 94; injection timing regulating means 97; and load-dependent injection timing adjustment means 100 are all conventional. These components may, for example, be found in the Type VE distributor pump injection system manufactured by Robert Bosch GmbH of the Federal Republic of Germany. The preceding components may also be found in the Type VA distributor pump injection system made by the same manufacturer. The type VE injection system has a mechanical engine speed regulating means while the Type VA system has a hydromechanical engine speed regulating means. Distributor pump injection systems such as Types VE and VA are used, for instance, in small, high rpm diesel engines, e.g. passenger car diesel engines. The reason is that components such as the injection timing regulating means, the vane pump and the engine speed regulating means are integrated into the distributor injection pump so that a compact structure is obtained.

As illustrated in FIG. 15, an injection nozzle 59 may be considered to comprise a first portion 59a and a second portion 59b. The first portion 59a includes all components of the injection nozzle 59 except for the spring 69 or rod 74 provided in addition to the spring 65, and except for the fluid passages associated with the spring 69 or rod 74. The second portion 59b of the injection nozzle 59 may be designated a pressure regulating circuit and includes the spring 69 or rod 74 and the fluid passages associated therewith.

In contrast to the conventional distributor pump injection systems, the pressure regulating circuit 59b in accordance with the invention is designed to divide the performance range of the engine 50 into a plurality of operating bands as discussed previously. In the present embodiment, the performance range of the engine 50 is divided into the four bands I–IV and this is schematically shown in FIG. 15 by the boxes marked I–IV. Division of the performance range of the engine 50 into the bands I–IV is accomplished by appropriate selection of the characteristics of the spring 69 or rod 74 constituting part of the pressure regulating circuit 59b.

In accordance with the invention, a hydraulic pressure line 109 leads from each pressure valve 88 to the corresponding spring 69 or rod 74. In this manner, the fuel delivers a pressure signal to the spring 69 or rod 74. The boxes I–IV identifying the desired operating bands for the engine 50 represent particular pintle displacements or fuel discharge areas which are achieved by suitable adjustment of the spring 69 or appropriate design of the rod 74. The corresponding changes in the pressure which acts upon the spring 69 or the rod 74 occur in response to displacement of the pintle 11.

Nozzles with variable fuel discharge areas have heretofore found particular application in engines which, contrary to the engine 50, are provided with a precombustion chamber. Such nozzles were found to be more economical than apertured nozzles having a constant discharge area. In engines with a precombustion chamber, a throttling pintle nozzle provides the advantage that the first quantity of fuel, i.e. the preliminary jet, injected during displacement of the pintle is subject to better atomization than the quantity of fuel, i.e. the main jet, injected subsequently. Thus, a relatively small amount of fuel, namely, the preliminary jet, undergoes self-ignition. As a result, the generation of noise is reduced.

In these conventional engines, the injection of fuel is quasi unregulated. The ratio of the quantities of fuel in the preliminary and main jets is determined solely by the velocity of the rising pintle. Furthermore, both a preliminary jet and a main jet are always present, even in the lower idling range, since the fuel pressure always causes the pintle to move beyond the region of overlap corresponding to the region 14 of FIG. 5.

It may be assumed that, in the conventional engines under discussion, 5 mm$^3$ of fuel per stroke are injected during idling. Of this quantity, 2 mm$^3$ constitute the prelimiminary jet while 3 mm$^3$ constitute the main jet. At full load, 30 mm$^3$ of fuel are injected per stroke with 3-4 mm$^3$ constituting the preliminary jet and 26-27 mm$^3$ constituting the main jet.

It follows that this injection system cannot be employed to divide the performance range of the engine into bands including one in which the nozzle delivers a virtually entirely atomized jet per stroke only and one in which the nozzle delivers a virtually entirely concentrated jet per stroke only.

If the injection system used in conventional engines with a precombustion chamber were employed in the engine 50 as is, little would be gained as compared to an injection system employing an apertured nozzle with a constant fuel discharge area. In this regard, it will be recalled that the engine 50 is a direct-injection internal combustion engine exhibiting the following features: (a) a combustion chamber 54 but no precombustion chamber; (b) directed injection of fuel into the combustion chamber 54; and (c) directed admission of air into the combustion chamber 54 so as to create an air swirl. These features are characteristic of an engine in which fuel is deposited on the wall of the combustion chamber during operation. The only advantage which would be realized by designing an engine such as the engine 50 with an unmodified injection system of the type used in conventional engines having a precombustion chamber rather than with an apertured nozzle having a constant discharge area is a slight reduction in uncombusted hydrocarbons in the lower idling range. This advantage stems from the fact that only a relatively small quantity of fuel will then deposit on the wall of the combustion chamber during idling. Thus, approximately half of the fuel will be injected into the combustion chamber in the form of an atomized preliminary stream.

In contrast to the prior art, the invention proposes to regulate the dwell time of the pintle in a desired position and thereby fully utilize the ability of the throttling pintle nozzle to generate different fuel jet characteristics throughout the performance range of the engine 50. This proposal represents a decided advance in the art. The significance of the proposal in accordance with the invention for an engine such as the engine 50 resides in that a virtually completely atomized jet per stroke only, as well as a virtually completely concentrated jet per stroke only, may be generated in the performance range of the engine. In other words, the ratio of the quantity of fuel deposited on the wall of the combustion chamber to the quantity of atomized fuel may be adjusted.

The characteristics of the fuel jet, that is, the distribution between the atomized fuel and that deposited on the wall of the combustion chamber 54, may be varied as required by dividing the maximum pintle displacement into steps. This, in turn, may be accomplished via mechanical means, for example. In this manner, it is possible to traverse the characteristic range of any parameter related to the operation of the engine 50.

The characteristic range of any given operating parameter of the engine 50 is divided into the same number of operating bands as there are steps in the maximum pintle displacement. In other words, each step in the maximum pintle displacement corresponds to an operating band. The manner in which the operating bands may be derived is explained with reference to FIGS. 16–19.

By way of example, FIGS. 16–19 relate to the amount of uncombusted hydrocarbons in the exhaust gas. It is assumed that the region of overlap 14 shown in FIG. 5 has a length of 0.3 mm.

FIGS. 16a–16e illustrate what occurs at maximum pintle lifts or displacements limited by force at 0.1, 0.2, 0.3, 0.4 and 0.5 mm, respectively. In each of FIGS. 16a–16e, the abscissa represents engine speed (n) in terms of percent of rated speed. The ordinate in each case represents the engine load in terms of mean effective pressure ($P_e$). The point LL on the abscissa indicates idling speed.

The full load curve of the developed engine is shown in each of FIGS. 16a–16e. When the maximum pintle lift or displacement is less than or equal to the length of the region of overlap 14, the characteristic curves terminate at an engine speed lower than the rated speed. The reason is that the pump pressure becomes excessive as long as the maximum pintle displacement is so small that the cylindrical portion 9 of the pintle 11 overlaps or is very close to the fuel discharge passage 15. This is indicated in FIGS. 16a–16c where the characteristic curves terminate at respective lines of constant engine speed identified by the legend "Limit Imposed by Excessive Pump Pressure". It will be observed that the full load curve of the developed engine in FIGS. 16a–16c cannot be followed in its entirety to achieve rated output at rated speed. However, the full load curve can be followed to a progressively greater degree as the maximum pintle displacement is allowed to increase from 0.1 to 0.3 mm. In this regard, it may be seen that the uppermost characteristic curve intersects the full load curve at progressively higher engine speeds in moving from FIG. 16a to FIG. 16c. It will be further observed that the limiting engine speed increases from FIG. 16a to FIG. 16c.

At a maximum pintle displacement of 0.4 mm, the cylindrical portion 9 of the pintle 11 clears the region of overlap 14 and the engine speed is no longer limited by excessive pump pressure. Nevertheless, throttling still occurs to a relatively great degree and, as shown in FIG. 16d, the full load curve of the developed engine can therefore not be followed in its entirety to achieve rated output at rated speed. However, the full load curve can be followed to a greater extent than at the maximum pintle displacements of FIGS. 16a–16c as evidenced by the point of intersection of the full load curve and the uppermost characteristic curve in FIG. 16d.

When the maximum pintle displacement is 0.5 mm, the proper quantity of fuel is injected by the nozzle 59 and the full load curve may be followed in its entirety to achieve rated output at rated speed. This is shown in FIG. 16e.

Graphs similar to those in FIGS. 16a–16e may be derived experimentally for smoke, fuel consumption and exhaust gas components other than hydrocarbons.

Figure 17:
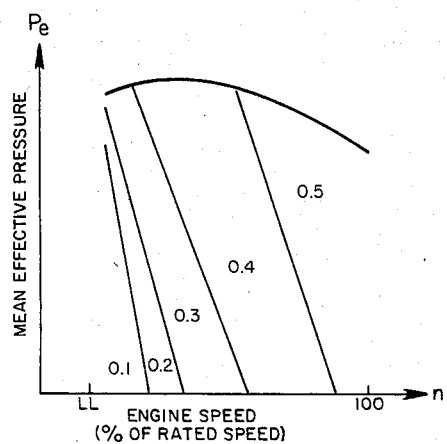
FIG. 17 is a characteristic plot of the concentration of uncombusted hydrocarbons in the exhaust gas versus engine speed and is derived from FIG. 16.

The graphs of FIGS. 16a–16e representing the HC or hydrocarbon concentration in the exhaust gas may be used to derive a characteristic plot which makes it possible to minimize hydrocarbon concentrations in a developed engine with automatically variable nozzle orifice. Such a plot is illustrated in FIG. 17 where the abscissa represents engine speed (n) in terms of percent of rated speed and the ordinate represents the load in terms of mean effective pressure ($P_e$). The plot of FIG. 17 is divided into five bands corresponding to the five steps of pintle displacement in FIGS. 16a–16e. The bands are separated by lines representing the respective constant pintle displacements. The HC or hydrocarbon concentration for the band 0.1 is shown in FIG. 16a, for the band 0.2 in FIG. 16b, for the band 0.3 in FIG. 16c and so on.

Figure 18:
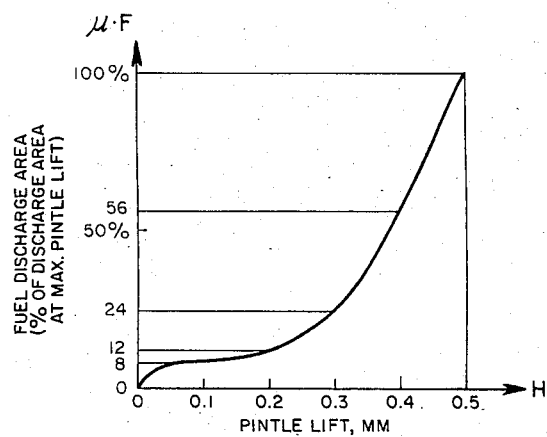
FIG. 18 is a plot of fuel discharge area versus pintle lift for the pintle nozzle used to obtain FIGS. 17 and 18.

FIG. 18 is a plot of pintle lift or displacement (H) in mm versus fuel discharge area ($\mu.F$) in terms of the percent of the discharge area at maximum pintle lift or displacement. As illustrated in FIG. 18, pintle lift or displacement bears a specific relationship to fuel discharge area so that the plot of FIG. 17 may be subdivided by lines of constant fuel discharge area rather than by lines of constant pintle displacement. The plot of FIG. 17 as it appears when divided into bands by lines of constant fuel discharge area is shown in FIG. 19 where the abscissa and the ordinate correspond to those in FIG. 17.

Figure 19:
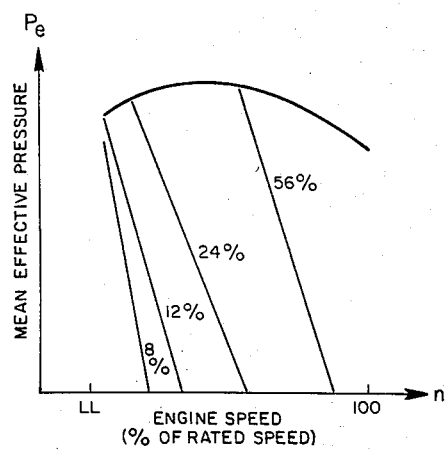
FIG. 19 is a characteristic plot of the concentration of uncombusted hydrocarbons in the exhaust gas versus engine speed and is derived from the needle lift of FIG. 17 and the characteristic curve of FIG. 18.

The characteristic plots of FIGS. 17 and 19 may be followed by automatically regulating pintle displacement as explained earlier.

The invention makes it possible to optimize the injection of fuel into a direct-injection engine such as the engine 50 where fuel deposits on the wall of the combustion chamber during operation. The results obtained by the invention offer particular advantages in small, direct-injection diesel engines.

The following Table compares emission and gas consumption data obtained in accordance with the invention to that obtained in accordance with the prior art. The data were derived using a motor vehicle weighing 2250 pounds and equipped with a 4-cylinder, direct-injection diesel engine having a displacement of 1.5 liters.

TABLE

| Operating Method | Uncombusted Hydrocarbons (HC in grams per mile) | Nitrogen Oxides ($NO_x$ in grams per mile) | Carbon Monoxide (CO in grams per mile) | Aldehyde Content or Odor (parts per million) | Fuel Consumption (miles per gallons) |
|---|---|---|---|---|---|
| Prior Art | 1.3 | 1.6 | 3.5 | 0 | 46 |
| Invention | 0.3 | 1.3 | 2.1 | 15 | 45 |

In summary, the performance range of the engine 50 is divided into a plurality of operating bands such as the bands I–IV of FIG. 2. The manner in which the performance range is divided depends upon the size of the engine 50, the range of engine speeds, the desired properties of the exhaust gas and the mode of operation of the engine 50. The fuel jet characteristics in the various bands I–IV differ and vary as a function of engine load and/or speed. The fuel jet characteristics are changed by varying the fuel discharge area of the injection nozzle 59. The desired variation of the fuel discharge area as a function of engine load and/or speed may be achieved by controlling certain nozzle parameters. One of these parameters is the nozzle geometry. For the nozzle illustrated in FIG. 3, the desired variation of the fuel discharge area is further dependent upon the characteristics of the spring 65 and/or the spring 69 in relation to the pressure generated by the injection pump 86. On the other hand, in addition to the nozzle geometry, the variation of the fuel discharge area in the nozzle of FIG. 4 is a function of the characteristics of the spring 65 and/or of the diameter of the rod 74 in relation to the pressure generated by the injection pump 86.

The pressure at the discharge passage 15 of the injection nozzle 59 depends upon the discharge velocity of the fuel which, in turn, depends upon the discharge area. The discharge area or pintle displacement changes relatively little in the bands I and II as may be observed in FIG. 6 while, as shown in FIGS. 10 and 11, for example, a sharp pressure differential may exist between these bands. In the band IV, essentially nothing occurs except for somewhat of a change in pressure. This is due to the fact that the maximum discharge area is obtained in the band IV.

In general, the injection pressure increases with increasing engine load and/or speed. According to the invention, it is desired that the injection pressure, and hence the discharge velocity of the fuel, undergo relatively little change over the entire performance range of the engine 50. This may be achieved by employing a pintle nozzle which is designed and arranged in such a manner that pintle displacement occurs as illustrated in FIGS. 7-11, i.e. a relatively slow increase in fuel discharge area in the lower range of engine load and speed followed by a more rapid increase in the upper range.

The bands I-IV in FIG. 2 are separated by lines 5-7 of constant maximum pintle displacement or constant maximum fuel discharge area. In proceeding along the lines 5-7 from bottom to top, the engine speed decreases while the load, i.e. the injection quantity, increases.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An air-compression, direct-injection internal combustion engine with compression-ignition or spark-ignition comprising:
   (a) a cylinder;
   (b) a piston reciprocable in said cylinder and having a crown, said crown being provided with a combustion chamber having the shape of a body of rotation, and said crown defining a wall which surrounds said combustion chamber;
   (c) admitting means for admitting air into said combustion chamber, said admitting means being arranged to generate an air swirl in said combustion chamber which circulates about the axis of the latter;
   (d) fuel injection means for injecting fuel into said combustion chamber, said injection means being provided with a fuel discharge passage and including a member movable between a closed position of said passage and a plurality of open positions of said passage, and said injection means being designed such that the effective cross-sectional area of said passage varies during movement of said member between said positions; and
   (e) control means for controlling said member so as to regulate the quantity of fuel which is injected into said combustion chamber as a function of at least one of the parameters load and speed of said engine, said control means being designed to move said member in such a manner that at least the predominant part of the fuel impinges upon said wall within the upper range of said one parameter to subsequently evaporate from said wall and mix with the air while at least the predominant part of the fuel mixes directly with the air during idling as well as in the lower range of said one parameter, and said control means also being designed so that the effective cross-sectional area of said passage in the lower range of said one parameter is maintained between 3 and 15% of the effective cross-sectional area of said passage at maximum output, said injection means and said control means further being designed in such a manner that the maximum injection pressure at said passage at nominal rating is 2 to 3 times the pressure required to open said passage.

2. The engine of claim 1, wherein said control means is designed to vary the effective cross-sectional area of said passage at a first rate in the lower range of said one parameter and at a substantially higher second rate in the upper range of said one parameter.

3. The engine of claim 1, wherein said control means is designed such that the fuel injection rate during idling is $1 \pm 0.5$ mm$^3$ per degree of crank angle and liter of piston-swept volume.

4. The engine of claim 1, wherein said control means is designed such that the fuel injection rate at full load and rated speed is $2 \pm 1$ mm$^3$ per degree of crank angle and liter of piston-swept volume.

5. The engine of claim 1, wherein said control means is designed to effect a fuel injection timing adjustment which, from full load to no load and at rated speed of said engine, is 20 to 50% of the maximum speed-dependent timing change and remains substantially constant between rated speed and idling.

6. The engine of claim 1, wherein said injection means and control means are designed in such a manner that the effective cross-sectional areas of said passage at full load and no load differ by approximately a factor of 10.

7. The engine of claim 1, wherein said injection means and control means are designed in such a manner that the effective cross-sectional area of said passage increases substantially continuously as said one parameter increases.

8. The engine of claim 1, wherein said control means is designed to regulate the effective cross-sectional area of said passage in such a manner that the fuel injection quantity at each load and speed essentially equals the optimum fuel injection quantity for such load and speed.

9. The engine of claim 1, wherein said control means is designed to adjust the fuel injection timing in dependence upon the speed of said engine.

10. The engine of claim 1, wherein said control means is designed to adjust the fuel injection timing in dependence upon the load to which said engine is subjected.

11. The engine of claim 1, wherein said control means comprises first biasing means for biasing said member towards said closed position while said member is between said closed position and a predetermined open position, and second biasing means arranged to additionally bias said member towards said closed position when said member reaches said predetermined open position.

12. The engine of claim 11, wherein at least one of said first and second biasing means comprises a spring.

13. The engine of claim 11, wherein at least one of said first and second biasing means comprises hydraulic means.

14. The engine of claim 1, wherein said injection means comprises a pintle nozzle.

15. A method of operating an internal combustion engine having a combustion chamber which is surrounded by a wall, said method comprising the steps of:
   (a) generating an air swirl in said combustion chamber which circulates about the axis of the latter;

(b) injecting fuel into said combustion chamber through a passage; and (c) regulating the injection of fuel into said combustion chamber as a function of at least one of the parameters load and speed of said engine, the regulating step including the operation of depositing at least the predominant part of the fuel upon said wall within the upper range of said one parameter to thereby cause at least the predominant part of the fuel to mix with the air subsequent to evaporation from said wall, and the regulating step further including the operation of directly mixing at least the predominant part of the fuel with the air during idling as well as in the lower range of said one parameter, the regulating step also including the operation of maintaining the effective cross-sectional area of said passage in the lower range of said one parameter between 3 and 15% of the effective cross-sectional area of said passage at maximum output, and the regulating step additionally including the operation of maintaining the maximum injection pressure at said passage at nominal rating 2 to 3 times greater than the pressure required to open said passage.

16. The method of claim 15, wherein the regulating step comprises varying the effective cross-sectional area of said passage at a first rate in the lower range of said one parameter and at a substantially higher second rate in the upper range of said one parameter.

17. The method of claim 15, wherein the fuel injection rate during idling is $1 \pm 0.5$ mm$^3$ per degree of crank angle and liter of piston-swept volume.

18. The method of claim 15, wherein the fuel injection rate at full load and rated speed is $2 \pm 1$ mm$^3$ per degree of crank angle and liter of piston-swept volume.

19. The method of claim 15, wherein the regulating step comprises effecting a fuel injection timing adjustment which, from full load to no load and at rated speed of said engine, is 20 to 50% of the maximum speed-dependent timing change and remains substantially constant between rated speed and idling.

20. The method of claim 15, wherein the regulating step comprises varying the effective cross-sectional area of said passage in such a manner that the cross-sectional areas at full load and no load differ by approximately a factor of 10.

21. The method of claim 15, wherein the regulating step comprises substantially continuously increasing the effective cross-sectional area of said passage as said one parameter increases.

22. The method of claim 15, wherein the regulating step comprises adjusting the effective cross-sectional area of said passage in such a manner that the fuel injection quantity at each load and speed essentially equals the optimum fuel injection quantity for such load and speed.

23. The method of claim 15, wherein the regulating step comprises adjusting the fuel injection timing in dependence upon the speed of said engine.

24. The method of claim 15, wherein the regulating step comprises adjusting the fuel injection timing in dependence upon the load to which said engine is subjected.

25. An air-compression, direct-injection internal combustion engine with compression-ignition or spark-ignition comprising:

(a) a cylinder;

(b) a piston reciprocable in said cylinder and having a crown, said crown being provided with a combustion chamber having the shape of a body of rotation, and said crown defining a wall which surrounds said combustion chamber;

(c) admitting means for admitting air into said combustion chamber, said admitting means being arranged to generate an air swirl in said combustion chamber which circulates about the axis of the latter;

(c) fuel injection means for injecting fuel into said combustion chamber, said injection means being provided with a fuel discharge passage and including a member movable between a closed position of said passage and a plurality of open positions of said passage, and said injection means being designed such that the effective cross-sectional area of said passage varies during movement of said member between said positions; and (e) control means for controlling said member so as to regulate the quantity of fuel which is injected into said combustion chamber as a function of at least one of the parameters load and speed of said engine, said control means being designed to move said member in such a manner that at least the predominant part of the fuel impinges upon said wall within the upper range of said one parameter to subsequently evaporate from said wall and mix with the air while at least the predominant part of the fuel mixes directly with the air during idling as well as in the lower range of said one parameter, and said control means also being designed so that the effective cross-sectional area of said passage in the lower range of said one parameter is between 3 and 15% of the effective cross-sectional area of said passage at maximum output, said injection means and said control means further being designed in such a manner that the maximum injection pressure at said passage at nominal rating is 2 to 3 times the pressure required to open said passage, and said control means additionally being designed so that, on a plot of fuel injection quantity versus fuel injection timing adjustment taken at constant engine speed, essentially all operating points lie within a region bounded by first and second pairs of substantially parallel lines, one line of said first pair lying substantially on the injection quantity axis and running from about 50 to about 100% of the full load injection quantity, and the other line of said first pair running from about 0 to about 50% of the full load injection quantity at a timing adjustment value substantially equalling 100% of the maximum timing adjustment, one line of said second pair extending substantially from the point representing 100% of the full load injection quantity and 0% of the maximum timing adjustment to the point representing 50% of the full load injection quantity and 100% of the maximum timing adjustment, and the other line of said second pair extending substantially from the point representing 50% of the full load injection quantity and 0% of the maximum timing adjustment to the point representing 0% of the full load injection quantity and 100% of the maximum timing adjustment.

26. The engine of claim 25, wherein said control means is designed to effect load-dependent fuel injection timing adjustment within said region along a straight line.

27. The engine of claim 25, wherein said control means is designed to effect load-dependent fuel injection timing adjustment within said region along a curved line.

28. A method of operating an internal combustion engine having a combustion chamber which is surrounded by a wall, said method comprising the steps of:
   (a) generating an air swirl in said combustion chamber which circulates about the axis of the latter;
   (b) injecting fuel into said combustion chamber through a passage; and
   (c) regulating the injection of fuel into said combustion chamber as a function of at least one of the parameters load and speed of said engine, the regulating step including the operation of depositing at least the predominant part of the fuel upon said wall within the upper range of said one parameter to thereby cause at least the predominant part of the fuel to mix with the air subsequent to evaporation from said wall, and the regulating step further including the operation of directly mixing at least the predominant part of the fuel with the air during idling as well as in the lower range of said one parameter, the regulating step also including the operation of maintaining the effective cross-sectional area of said passage in the lower range of said one parameter between 3 and 15% of the effective cross-sectional area of said passage at maximum output, and the regulating step additionally including the operation of maintaining the maximum injection pressure at said passage at nominal rating 2 to 3 times greater than the pressure required to open said passage, the regulating step being performed in such a manner that, on a plot of fuel injection quantity versus fuel injection timing adjustment taken at constant engine speed, essentially all operating points lie within a region bounded by first and second pairs of substantially parallel lines, one line of said first pair lying substantially on the injection quantity axis and running from about 50 to about 100% of the full load injection quantity, and the other line of said first pair running from about 0 to about 50% of the full load injection quantity at a timing adjustment value substantially equalling 100% of the maximum timing adjustment, one line of said second pair extending substantially from the point representing 100% of the full load injection quantity and 0% of the maximum timing adjustment to the point representing 50% of the full load injection quantity and 100% of the maximum timing adjustment, and the other line of said second pair extending substantially from the point representing 50% of the full load injection quantity and 0% of the maximum timing adjustment to the point representing 0% of the full load injection quantity and 100% of the maximum timing adustment.

29. The method of claim 28, wherein the regulating step comprises effecting load-dependent fuel injection timing adjustment within said region along a straight line.

30. The method of claim 28, wherein the regulating step comprises effecting load-dependent fuel injection timing adjustment within said region along a curved line.

* * * * *

UNITED STATES PATENT AND TRADEMARK OFFICE
CERTIFICATE OF CORRECTION

PATENT NO. : 4,499,871

DATED : February 19, 1985

INVENTOR(S) : Alfred NEITZ et al.

It is certified that error appears in the above-identified patent and that said Letters Patent are hereby corrected as shown below:

Column 24, TABLE: Prior Art Aldehyde Content or Odor (parts per million), change "0" to --60--.
Column 27, line 20, change "regulatihg" to --regulating--.
Column 28, line 11, change "(c)" to --(d)--.

Signed and Sealed this

Sixteenth Day of July 1985

[SEAL]

Attest:

DONALD J. QUIGG

Attesting Officer    Acting Commissioner of Patents and Trademarks